US008646386B2

(12) United States Patent
Rastegar

(10) Patent No.: US 8,646,386 B2
(45) Date of Patent: Feb. 11, 2014

(54) MINIATURE SAFE AND ARM MECHANISMS FOR FUZING OF GRAVITY DROPPED SMALL WEAPONS

(75) Inventor: Jahangir S. Rastegar, Stony Brook, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 268 days.

(21) Appl. No.: 13/297,234

(22) Filed: Nov. 15, 2011

(65) Prior Publication Data

US 2012/0291613 A1    Nov. 22, 2012

Related U.S. Application Data

(63) Continuation-in-part of application No. 12/983,301, filed on Jan. 1, 2011, now Pat. No. 8,443,726.

(60) Provisional application No. 61/303,294, filed on Feb. 10, 2010.

(51) Int. Cl.
*F42C 11/00*    (2006.01)

(52) U.S. Cl.
USPC ......................................... 102/207; 102/208

(58) Field of Classification Search
USPC ............ 102/207, 208; 89/6–6.5, 1.811–1.812
See application file for complete search history.

(56) References Cited

U.S. PATENT DOCUMENTS

| | | | | |
|---|---|---|---|---|
| 2,820,411 A | * | 1/1958 | Park ................................ | 102/209 |
| 3,747,896 A | * | 7/1973 | Botzum ......................... | 254/323 |
| 3,757,695 A | * | 9/1973 | Fisher ........................... | 102/207 |
| 3,961,577 A | * | 6/1976 | O'Steen ........................ | 102/208 |
| 3,990,370 A | * | 11/1976 | Campagnuolo et al. ....... | 102/208 |
| 4,027,593 A | * | 6/1977 | Campagnuolo et al. ....... | 102/208 |
| 4,031,827 A | * | 6/1977 | Collier .......................... | 102/208 |
| 4,089,268 A | * | 5/1978 | Jaroska et al. ................. | 102/216 |
| 4,161,371 A | * | 7/1979 | Sheppa .......................... | 416/43 |
| 4,201,136 A | * | 5/1980 | Morris .......................... | 102/214 |
| 4,567,828 A | * | 2/1986 | Campagnuolo et al. ....... | 102/208 |
| 4,656,943 A | * | 4/1987 | Edminster ...................... | 102/208 |
| 4,858,530 A | * | 8/1989 | Edminister et al. ........... | 102/208 |
| 4,898,342 A | * | 2/1990 | Kranz et al. .................. | 244/3.21 |
| 4,969,396 A | * | 11/1990 | Siebert .......................... | 102/225 |
| 8,245,641 B2 | * | 8/2012 | Rastegar ....................... | 102/207 |

* cited by examiner

*Primary Examiner* — Michelle Clement

(57) ABSTRACT

Methods and devices for differentiating an actual air drop of a gravity dropped weapon from an accidental drop of the weapon onto a surface. The method including: connecting a first end of at least one lanyard to an airframe; releasably connecting a second end of the at least one lanyard to a power generation device such that release of the second end with the power generation device initiates power generation by the power generation device; and releasably connecting a third end of the at least one lanyard to at least a portion of an air velocity sensor such that release of the third end one of activates or exposes the air velocity sensor to an air stream; and differentiating the actual air drop from the accidental drop based at least on a detection of an air velocity by the air velocity sensor.

17 Claims, 21 Drawing Sheets

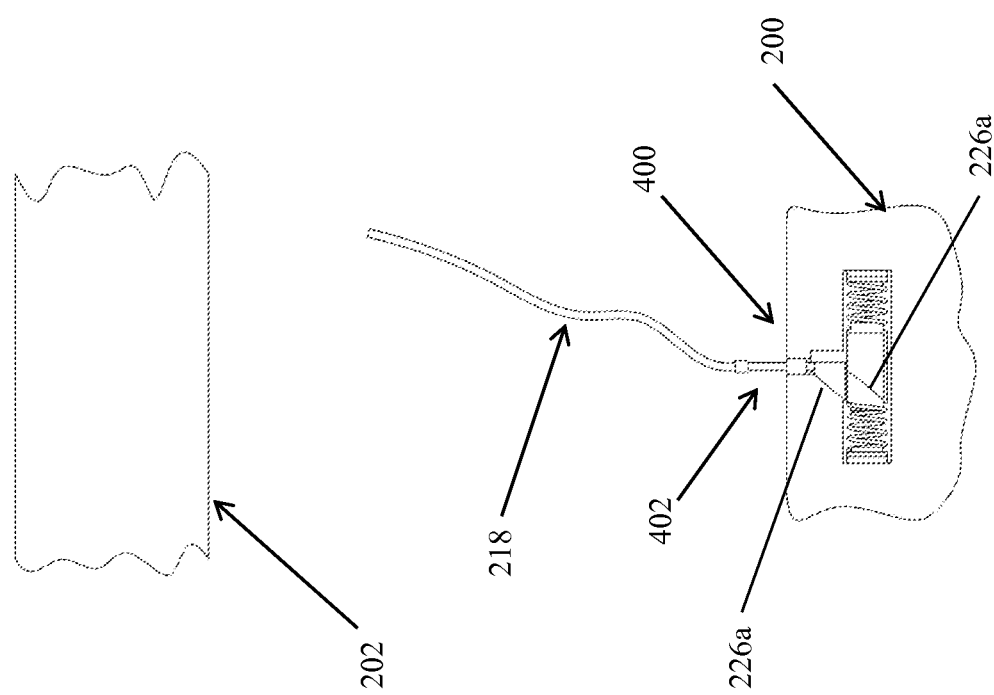

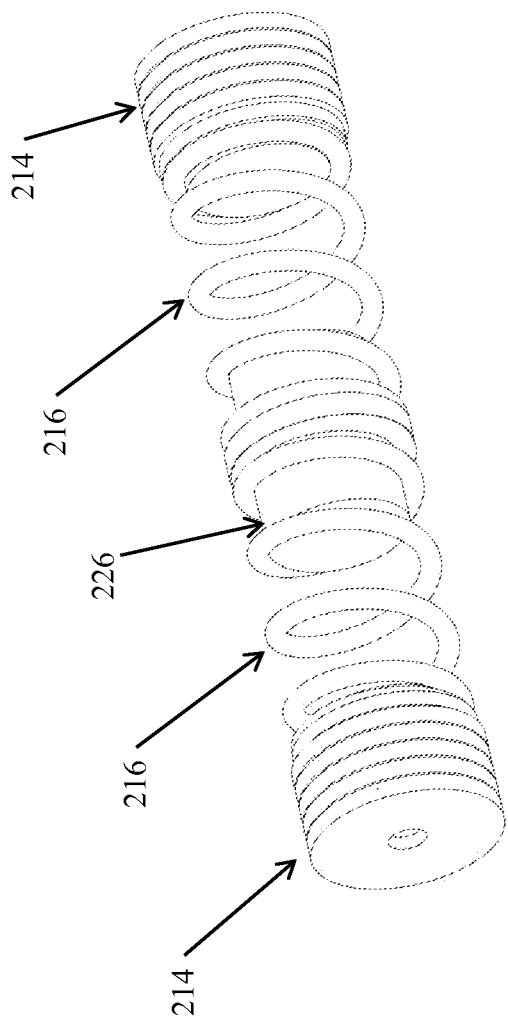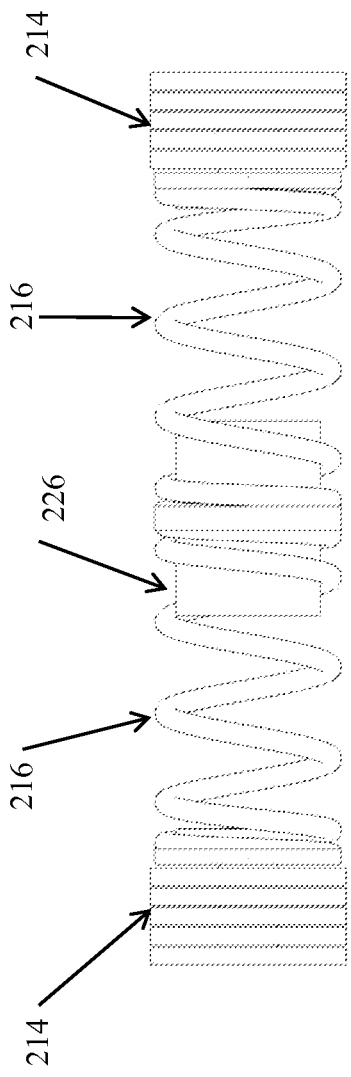
FIGURE 13a
FIGURE 13b

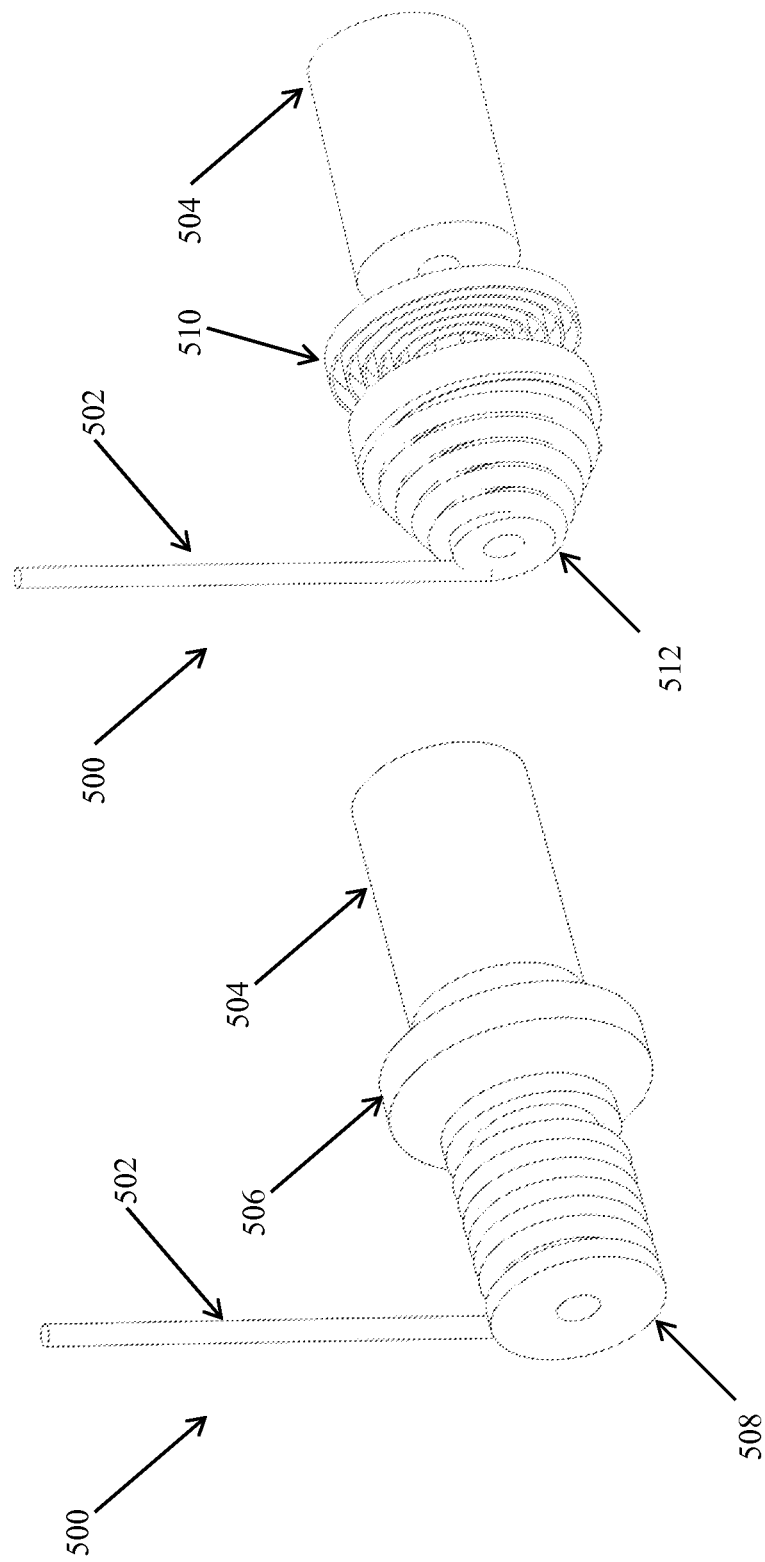

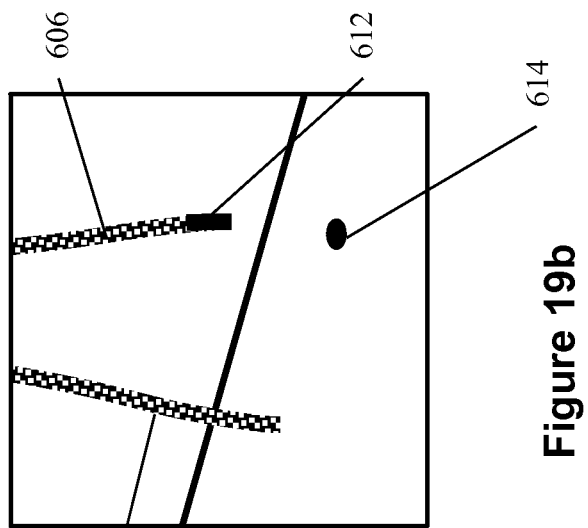
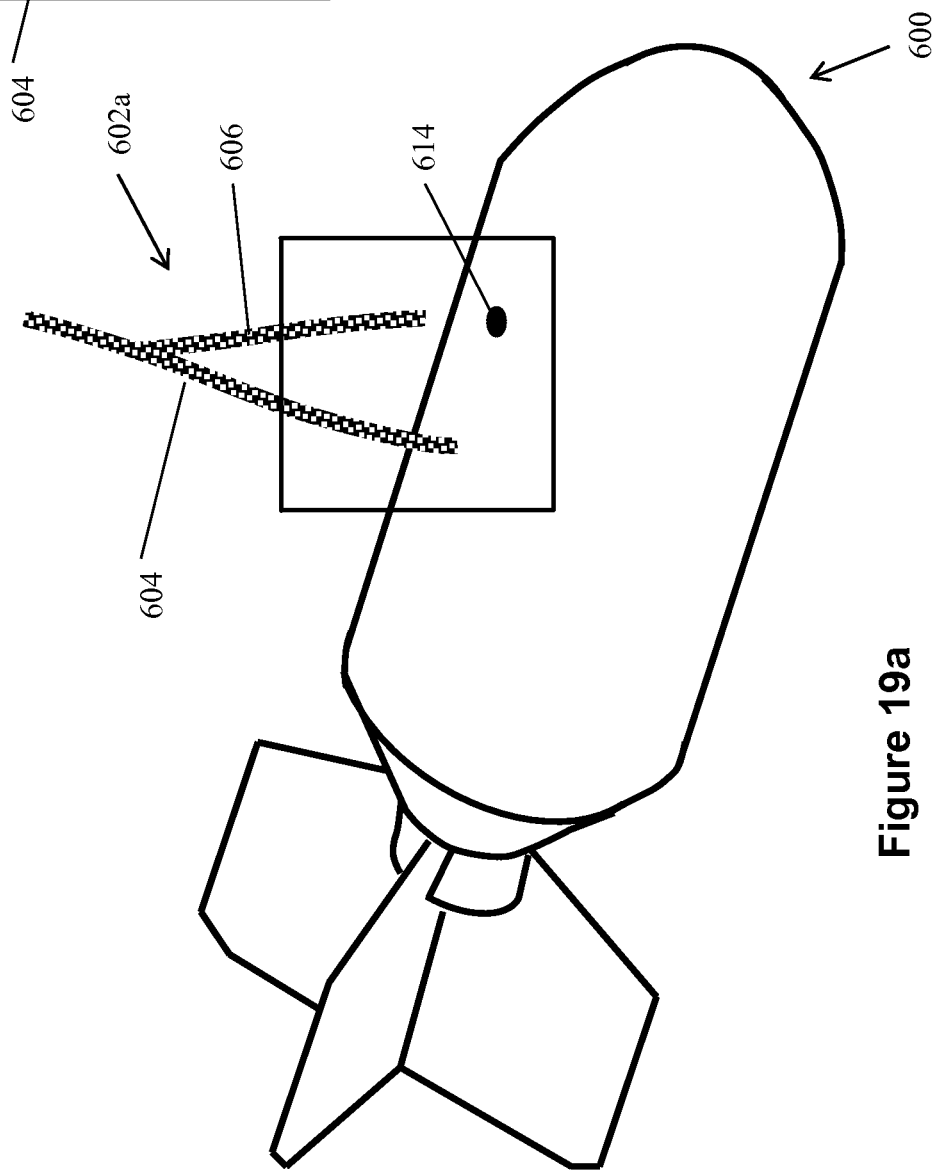

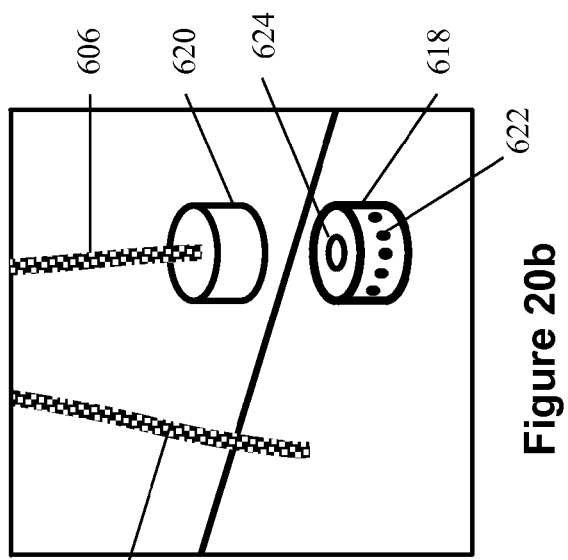
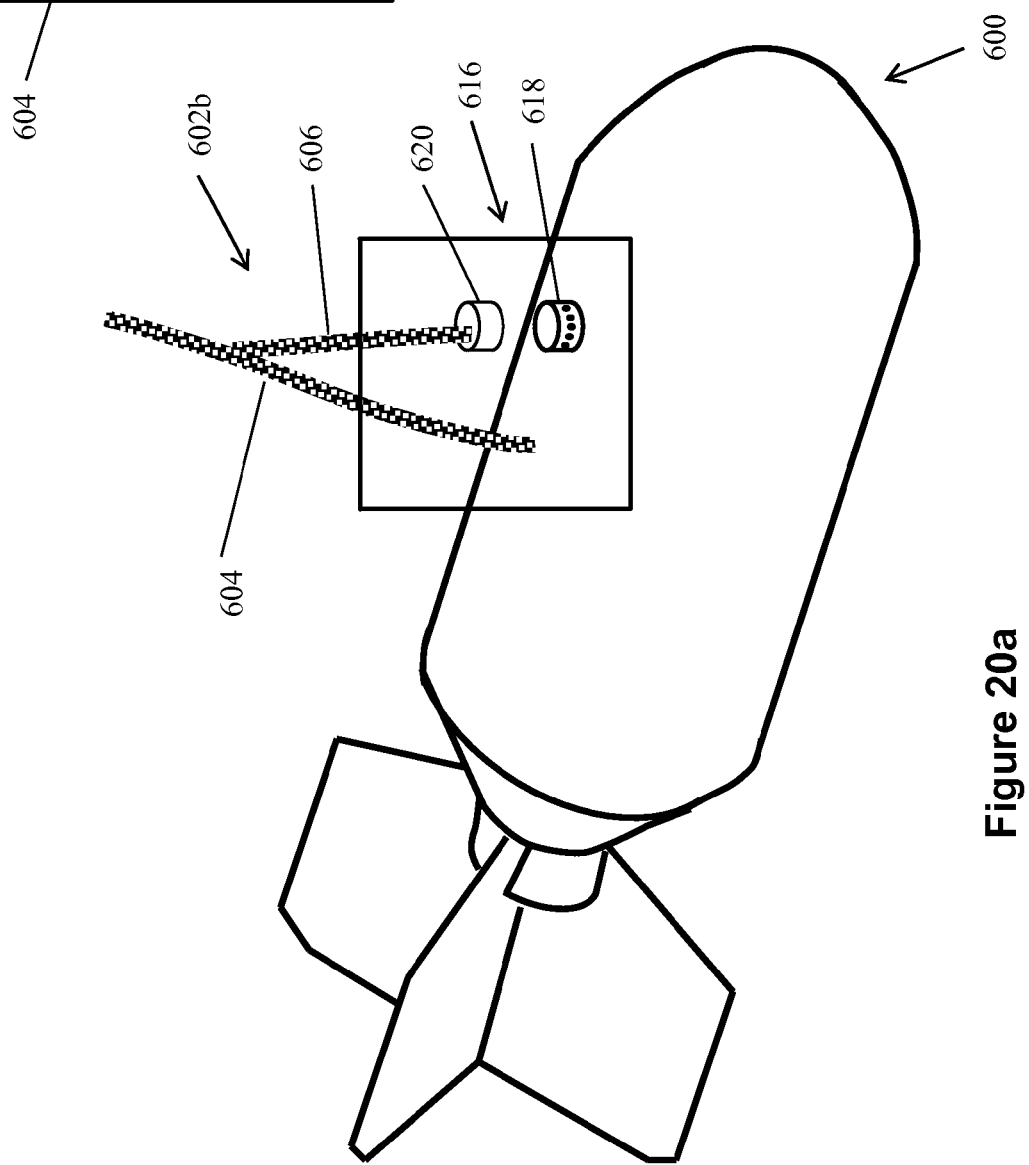
Figure 20b
Figure 20a

US 8,646,386 B2

MINIATURE SAFE AND ARM MECHANISMS FOR FUZING OF GRAVITY DROPPED SMALL WEAPONS

CROSS-REFERENCE TO RELATED APPLICATIONS

This application is a Continuation-In-Part application of U.S. application Ser. No. 12/983,301, filed on Jan. 1, 2011, which claims benefit to U.S. Provisional Application No. 61/303,294 filed on Feb. 10, 2010, the entire contents of each of which is incorporated herein by reference. This application is related to U.S. patent application Ser. No. 12/606,893 filed on Oct. 27, 2009, the entire contents of which is incorporated herein by reference.

GOVERNMENT RIGHTS

This invention was made with Government support under contract FA8651-10-C-0145 awarded by the United States Air Force. The Government has certain rights in the invention.

BACKGROUND OF THE INVENTION

1. Field of the Invention

The present invention relates generally to small weapon systems, and more particularly, to methods for enabling safe/arm functionality within small weapons.

2. Prior Art

All weapon systems require fuzing systems for their safe and effective operation. A fuze or fuzing system is designed to provide, as a primary role, safety and arming functions to preclude munitions arming before the desired position or time, and to sense a target or respond to one or more pre-scribed conditions, such as elapsed time, pressure, or command, and initiate a train of fire or detonation in a munition.

Fuze safety systems consist of an aggregate of devices (e.g., environment sensors, timing components, command functioned devices, logic functions, plus the initiation or explosive train interrupter, if applicable) included in the fuze to prevent arming or functioning of the fuze until a valid launch environment has been sensed and the arming delay has been achieved.

Safety and arming devices are intended to function to prevent the fuzing system from arming until an acceptable set of conditions (generally at least two independent conditions) have been achieved.

A significant amount of effort has been expended to miniaturize military weapons to maximize their payload and their effectiveness and to support unmanned missions. The physical tasking of miniaturization efforts have been addressed to a great extent. However, the same cannot be said regarding ordnance technologies that support system functional capabilities, for example for the case for fuzing.

It is important to note that simple miniaturization of subsystems alone will not achieve the desired goal of effective fuzing for smaller weapons. This is particularly the case in regards to environmental sensing and the use of available stimuli in support of "safe" and "arm" functionality in fuzing of miniature weapon technologies.

A need therefore exists for the development of methods and devices that utilize available external stimuli and relevant detectable events for the design of innovative miniature "safe" and "arm" (S&A) mechanisms for fuzing of gravity dropped small weapons.

SUMMARY OF THE INVENTION

The disclosed mechanisms achieve "safe" and "arm" (S&A) functionalities with at least the following characteristics.

They can be passive, i.e., do not require a battery or external means of powering; can be powered by novel piezoelectric-based power generators with zero stored energy prior to weapon release or alternatively by a modified version of the existing turbine generators, both of which are powered by the pulling of a lanyard as the weapon is released.

They can employ simple electronic circuitry and logics to assist "safe" and "arm" (S&A) and if desired fuzing functionalities, and when appropriate power other sensory and decision making functionalities. The basic electronic circuitry and logic can be used to detect weapon release event, elapsed time, etc.

The mechanisms based on piezoelectric elements can provide electrical energy and release event indication signal almost instantaneously (2-3 msec) upon release to power fuzing electronic and logics circuitry, thereby making them highly suitable for weapons dropped from almost any altitude, even very high and very low altitudes; by employing a simple "distributed" piezoelectric element design, in addition to the target impact event detection, the impact force level (hard or soft target) and its direction may be determined and used for various fuzing purposes as well as for self-destruct or disarming purposes to reduce collateral damage and creation of UXOs.

The piezoelectric-based generators can be relatively small and low cost since they are constructed with off-the-shelf components. The overall packaging electronic and logics circuitry and the power generation devices can be very small and low cost since they can be produced using standard manufacturing techniques and components.

Accordingly, a device for differentiating an actual air drop of a gravity dropped weapon from an accidental drop of the weapon onto a surface is provided. The device comprising: a power generation device disposed on or in the gravity dropped weapon; an air velocity sensor disposed on or in the gravity dropped weapon; and one or more lanyards having: a first end connected to an airframe; a second end releasably connected to the power generation device such that release of the second end with the power generation device initiates power generation by the power generation device; and a third end releasably connected to at least a portion of the air velocity sensor such that release of the third end one of activates or exposes the air velocity sensor to an air stream; wherein differentiating the actual air drop from the accidental drop is at least based on a detection of an air velocity by the air velocity sensor.

The power generation device can include an elastic element which is released by the second end. The power generation device can further include a piezoelectric member connected to one end of the elastic member for converting one or more of a stored and generated energy of the elastic member to an electrical energy.

The one or more lanyards can comprise a single lanyard having the first and second ends and the single lanyard further comprising a lanyard portion connected to the single lanyard, where the lanyard portion includes the third end.

The air velocity sensor can be one or more Pitot-tubes. The one or more Pitot-tubes and third end can be configured such that the one or more Pitot-tubes are deployed by the release of the third end. The one or more Pitot-tubes and third end can be configured such that the one or more Pitot-tubes are exposed by the release of the third end.

The third end can include one of a plug or cover for exposing the air velocity sensor upon release of the third end.

The air velocity sensor can be one or more orifices configured as a Bernoulli effect sensor of air velocity.

The one or more orifices and third end can be configured such that the one or more orifices are exposed by the release of the third end. The one or more orifices can comprise two or more orifices, each of which can be configured to sense the air flow from a different direction.

Differentiating the actual air drop from the accidental drop can be further based on a detection of power generated by the power generation device.

Also provided is a method for differentiating an actual air drop of a gravity dropped weapon from an accidental drop of the weapon onto a surface. The method comprising: connecting a first end of at least one lanyard to an airframe; releasably connecting a second end of the at least one lanyard to a power generation device such that release of the second end with the power generation device initiates power generation by the power generation device; and releasably connecting a third end of the at least one lanyard to at least a portion of an air velocity sensor such that release of the third end one of activates or exposes the air velocity sensor to an air stream; and differentiating the actual air drop from the accidental drop based at least on a detection of an air velocity by the air velocity sensor.

The release of the second end can initiate the power generation in the power generation device by converting one or more of a stored and generated energy of an elastic member of the power generation device to an electrical energy.

The release of the third end can one or more deploy or expose the air velocity sensor.

The air velocity sensor can be configured to detect the air velocity from more than one direction.

The differentiating of the actual air drop from the accidental drop can be further based on a detection of power generated by the power generation device.

BRIEF DESCRIPTION OF THE DRAWINGS

These and other features, aspects, and advantages of the apparatus and methods of the present invention will become better understood with regard to the following description, appended claims, and accompanying drawings where:

FIG. 12 illustrates the weapon as released and totally separated from the rack.

FIGS. 13a and 13b illustrate a mass-spring type piezoelectric-based electrical energy harvesting power source and its frontal view.

FIG. 14a illustrates a direct-drive dynamo with flywheel and FIG. 14b illustrates a two-stage rip cord and torsion spring generator.

FIG. 19a illustrates the gravity dropped weapon of FIG. 18 (without the cut-away) after lanyard pull.

FIG. 19b illustrates an enlarged portion of the device of FIG. 19a.

FIG. 20a illustrates a schematic of a gravity dropped weapon having a second variation of a second embodiment of a device to differentiate air-drops from accidental ground-drops prior to lanyard pull.

FIG. 20b illustrates an enlarged portion of the device of FIG. 20a.

DETAILED DESCRIPTION OF THE PREFERRED EMBODIMENT

Figure 1:
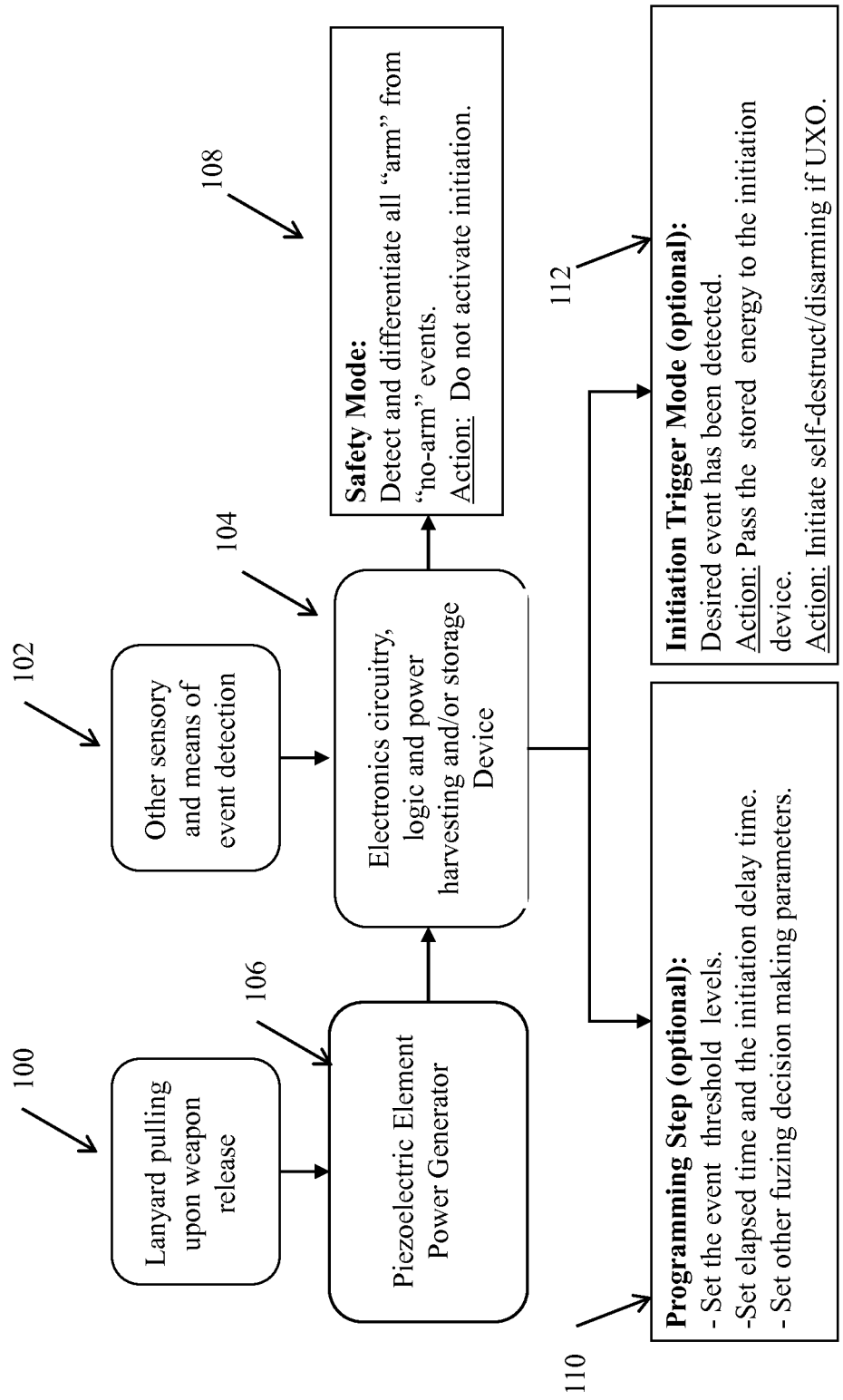
FIG. 1 illustrates a block diagram of a piezoelectric-based event detection and power generation device with electronic circuitry and logics for "safe" and "arm" (S&A) and other fuzing functionalities in small gravity dropped weapons.

A block diagram representing a design of the devices for providing "safe" and "arm" (S&A) functionalities as well other possible fuzing functionalities is shown in FIG. 1. In FIG. 1, a detonation step is also provided for the sole purpose of indicating how a fuzing functionality such as detonation of initiation charges may also be achieved.

The devices can use piezoelectric-based power generators described below. The piezoelectric generators begin to produce power upon weapon release by the pulling of the lanyard 100. Other sensory devices and means can be used for the event detection 102. Each of the lanyard pulling and other sensory output is input to electronics circuitry logic and power harvesting and storage 104. The piezoelectric element of the power generator 106 can be pre-loaded to prevent it from generating a significant amount of energy that could otherwise power the device electronics as a result of accidental dropping or due to transportation induced vibratory motions. The piezoelectric-based power generator 106 provides an AC voltage with the frequency of vibration of its mass-spring elements, which is selected for transportation safety and power generation efficiency, with a typical practical range of 100-1000 Hz, which can also be used to measure the elapsed time post weapon release. By using an appropriately stacked piezoelectric element, almost any peak voltage levels (from a few Volts to 100s of Volts or even more) could be achieved.

The electronic circuitry and logics 104 can be very simple, such as the circuitry described for the electrically initiated inertial igniters in U.S. Patent Application Publication No. 2009-0013891 (the contents of which are incorporated herein by reference) or any other appropriate circuitry but may have appropriate modifications to match the specific requirements of the gravity dropped small weapons. The circuitry can be designed to work without the need for microprocessors. However, microprocessors may also be added if more complex sensors and computational capabilities are desired to be included in the package, e.g., if the package is to be used for weapon guidance or for processing target impact data and making UXO avoidance decisions. As shown in FIG. 1, as described below and in U.S. Patent Application Publication No. 2009-0013891, the electronics circuitry detects and differentiates all arm from no-arm events and does not activate initiation where a no-arm event is detected 108. Other optional programming steps 110 and initiation trigger modes 112 are also illustrated in FIG. 1.

Piezoelectric-Based Event Detection and Electrical Energy Generator Concepts

A number of piezoelectric-based event detection and electrical energy generator embodiments are disclosed below. All embodiments are passive, have zero stored mechanical and/or electrical energy prior to weapon release, and begin generating electrical energy by the pulling of the lanyard as the weapon is released from a rack.

a. Floating Hinged Preloading Linkage Mechanism

Figure 2:
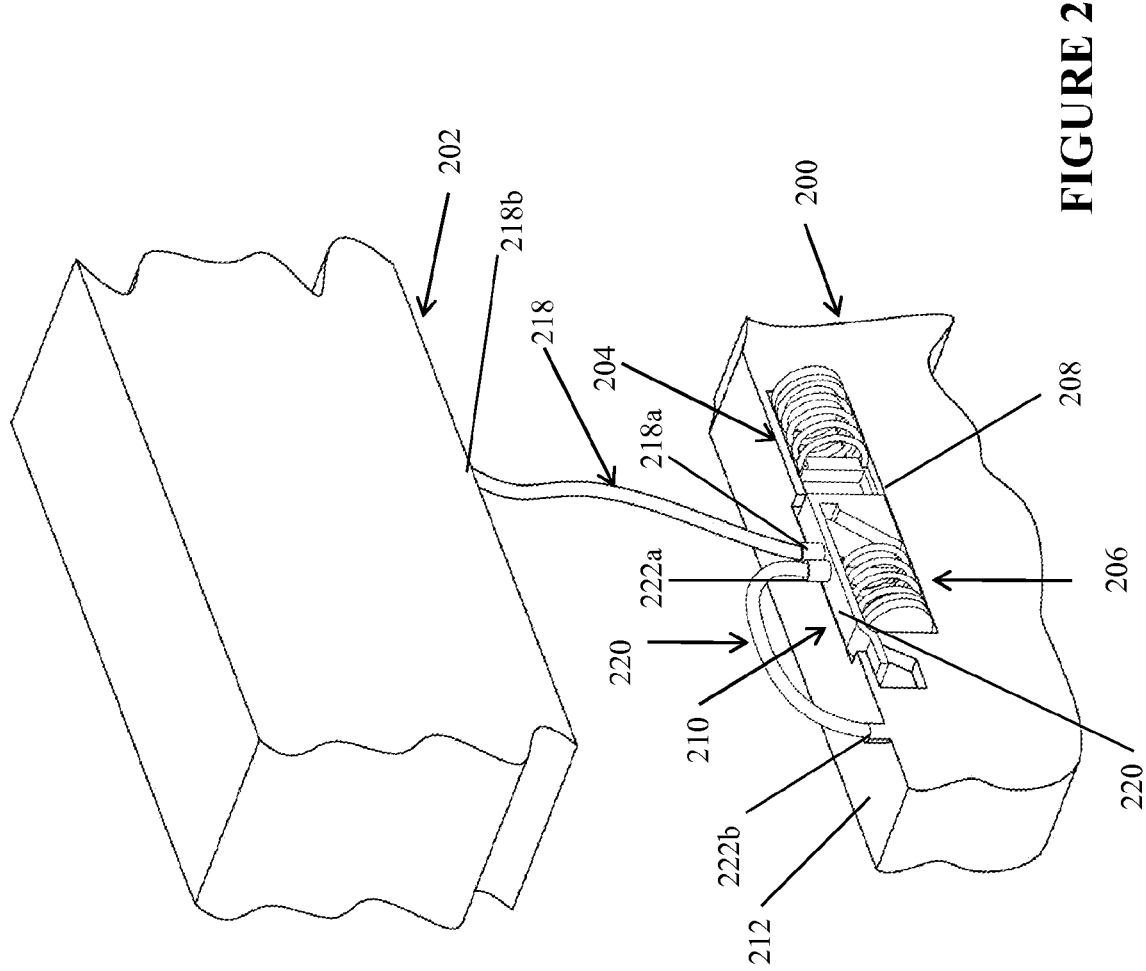
FIG. 2 illustrates the piezoelectric-based event detection and electrical power generator unit with the weapon mounted onto the weapon rack.

A schematic of a first design concept with the weapon 200 mounted onto a release rack 202 is shown in FIG. 2. The close-ups of the piezoelectric-based event detection and power generator are shown in FIG. 3 (close-up) and FIG. 4 (side-view).

Figure 3:
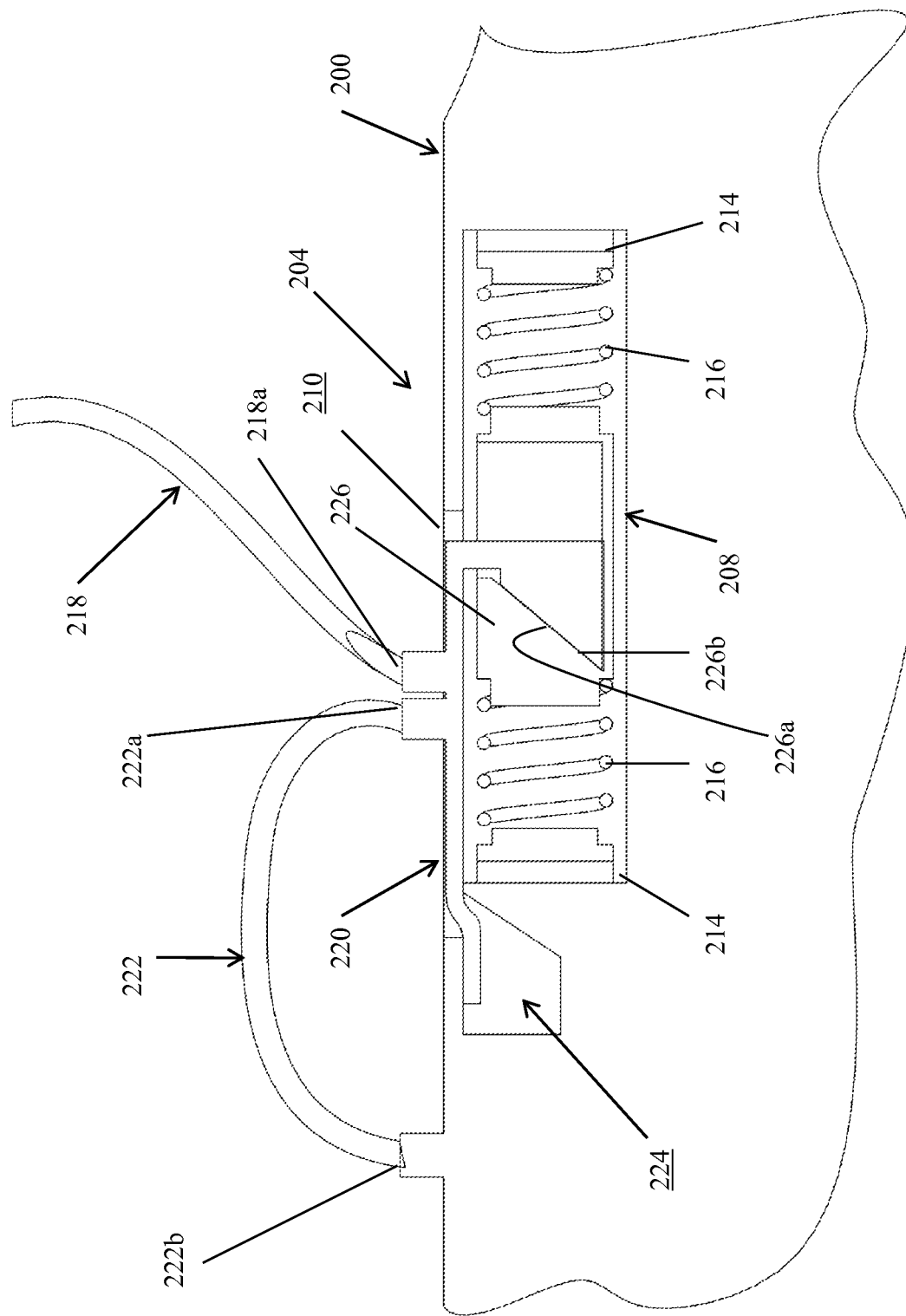
FIG. 3 illustrates a side-view close-up of the piezoelectric-based event detection and electrical power generator unit.
Figure 4:
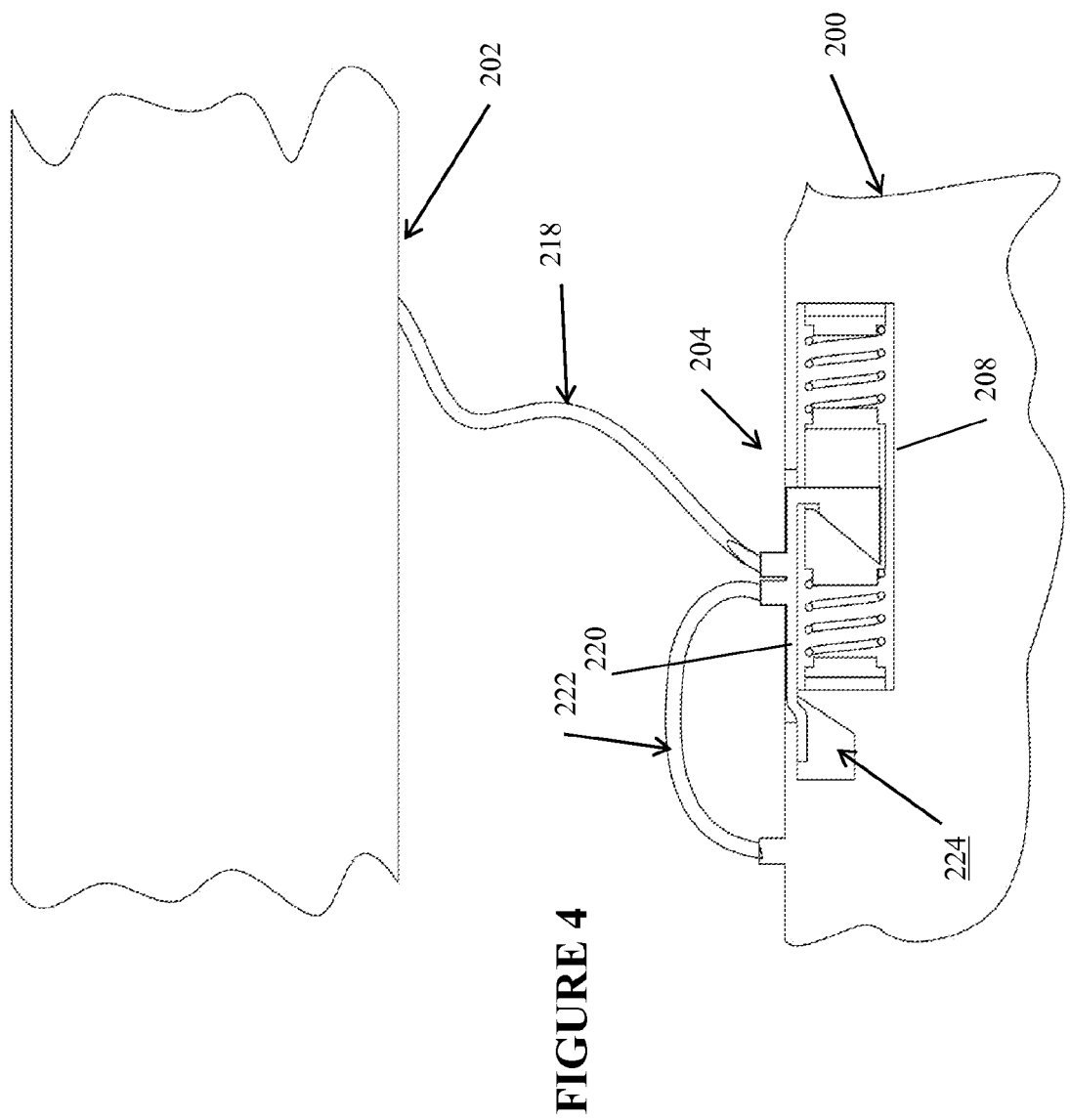
FIG. 4 illustrates side-view of the piezoelectric-based event detection and electrical power generator unit with the weapon mounted onto the weapon rack.

A piezoelectric-based event detection and electrical energy power generator 204 shown in FIGS. 2-4 consists of a mass-spring unit 206. The mass-spring unit 206 is positioned inside a housing 208, which is attached to the structure of the weapon 200. An access port 210 is provided on the weapon shell 212 to expose the upper portion of the generator 204. A set of piezoelectric (stack) elements 214 are positioned between one or both springs 216 and the device housing 208. When the weapon is mounted onto the rack 202, a weapon lanyard 218 is attached to a spring preloading wedge mechanism link 220 at a first point 218a and to the rack 202 at a second point 218b. A second lanyard 222 (or portion of the lanyard 218) connects the wedge mechanism link 220 at point 222a to the weapon 200 at point 222b.

Figure 5:
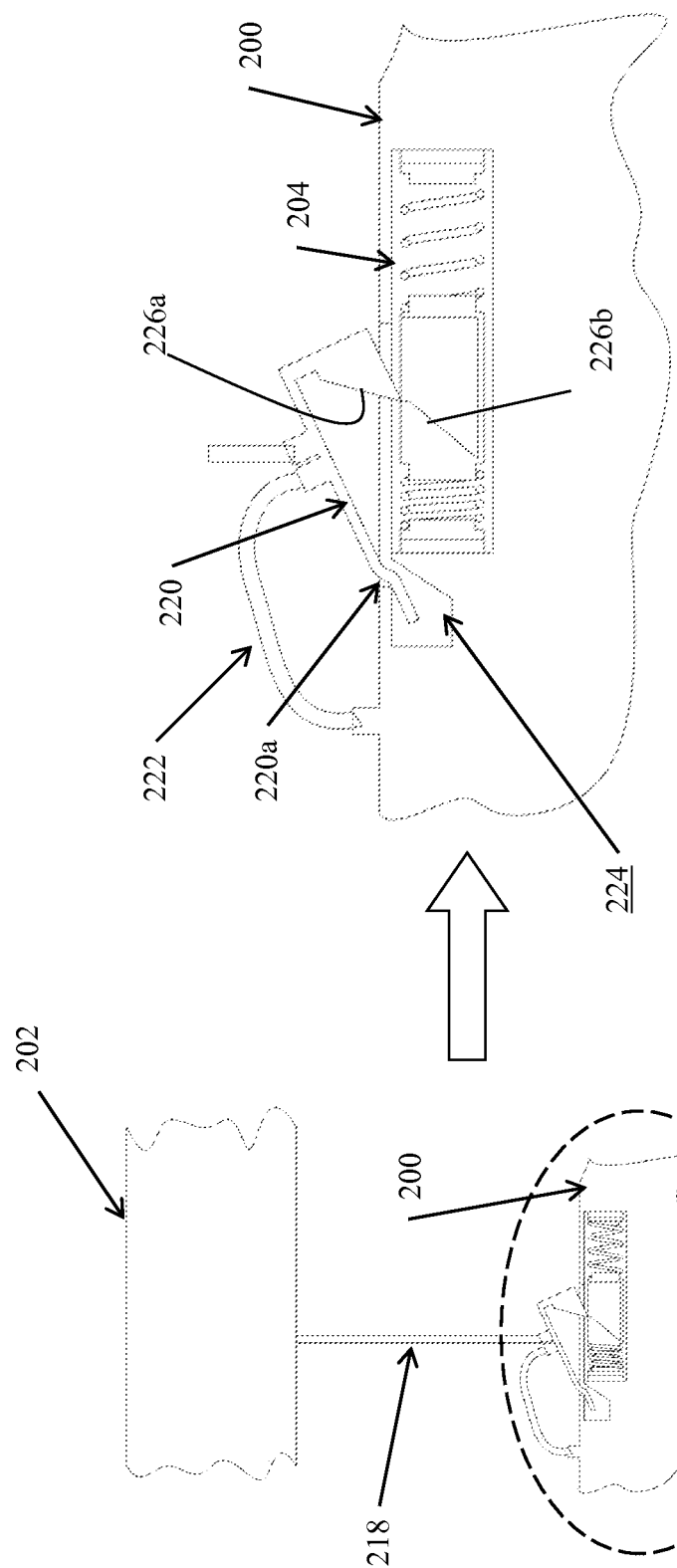
FIG. 5 illustrates the weapon being released, where the lanyard pulls on the spring preloading wedge mechanism link, rotating it counterclockwise to preload the device springs.

When the weapon 200 is released from the rack 202, the weight of the weapon 200 pulls on the lanyard 218. As a result, the preloading wedge mechanism link 220 is pulled up, causing it to rotate counterclockwise about its hinged end 220a as shown in FIG. 5. Such hinge can be of any known in the art, such as a piano-type hinge, a "living" joint or a hinge cavity 224 as shown in FIG. 5. The hinged end 220a is free to rotate within the hinge cavity 224. A mass element 226 positioned between the springs 216 is retained by mating inclined surfaces 226a on the wedge mechanism link 220 and 226b on the mass element 226. When the lanyard rotates the link 220 as shown in FIG. 5, the mass element 226 is pulled to the right, thereby preloading the springs 216. The mass element 226 is then suddenly released as the lanyard 218 is pulled further allowing a tip of the surface 226a of the link 220 to clear the surface 226b formed on the mass element 226. At this point, the mass-spring unit 206 is free to vibrate, thereby applying a cyclic load to the piezoelectric element(s) 214 that are positioned between the spring elements 216 and the generator housing 208. The cyclic load would in turn generate a charge in the piezoelectric element, which is then harvested and used directly to power electronics circuitry and logics and/or stored in an electrical energy storage device such as a capacitor or super-capacitor (such circuitry and/or storage device shown as box 104 in FIG. 1).

Figure 6:
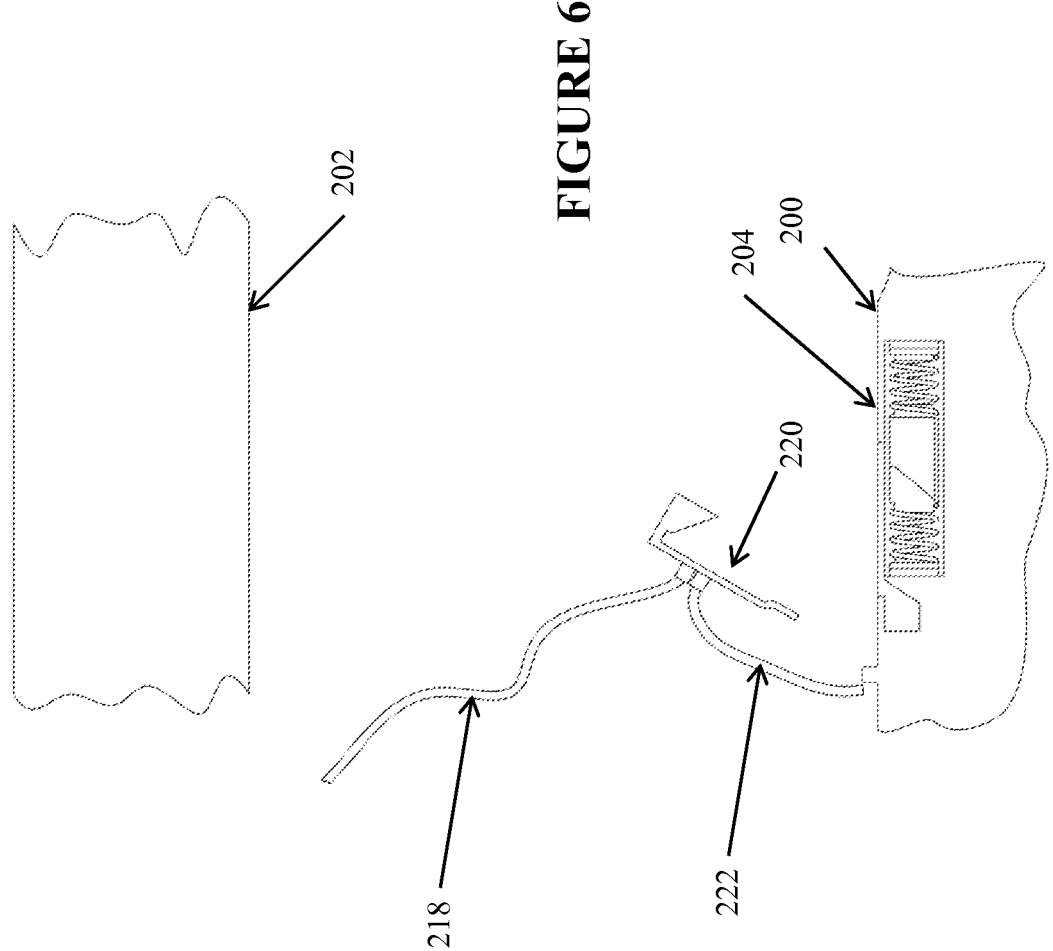
FIG. 6 illustrates the weapon after release, the lanyard pulls on the spring preloading wedge link, preloads the generator spring, then releasing the mass causing the generator mass-spring unit to begin to vibrate. The wedge link is then released from its hinge cavity.
Figure 7:
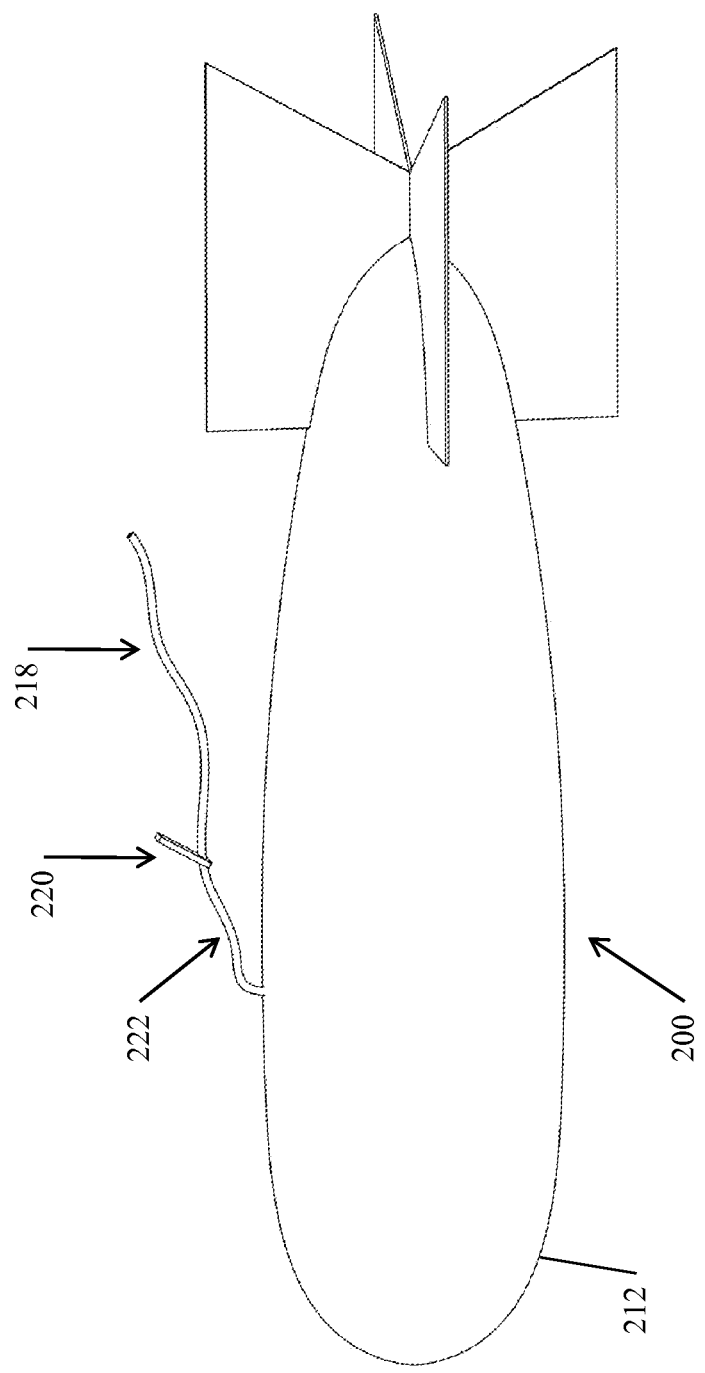
FIG. 7 illustrates the released weapon with the wedging mechanism link attached to the lanyard.

By further pulling of the lanyard 218, the spring preloading wedge mechanism link 220 is freed from its "hinge cavity" 224, FIG. 6, and would then be "dragged" along by the second lanyard 222 as shown in FIGS. 6 and 7. The released preloading wedge mechanism link 220, may also be used to serve a useful purpose such as to flutter in the airstream to excite the mass-spring unit of the power generator to generate more electrical energy as described below.

b. Fixed Hinge Preloading Linkage Mechanism

Figure 8:
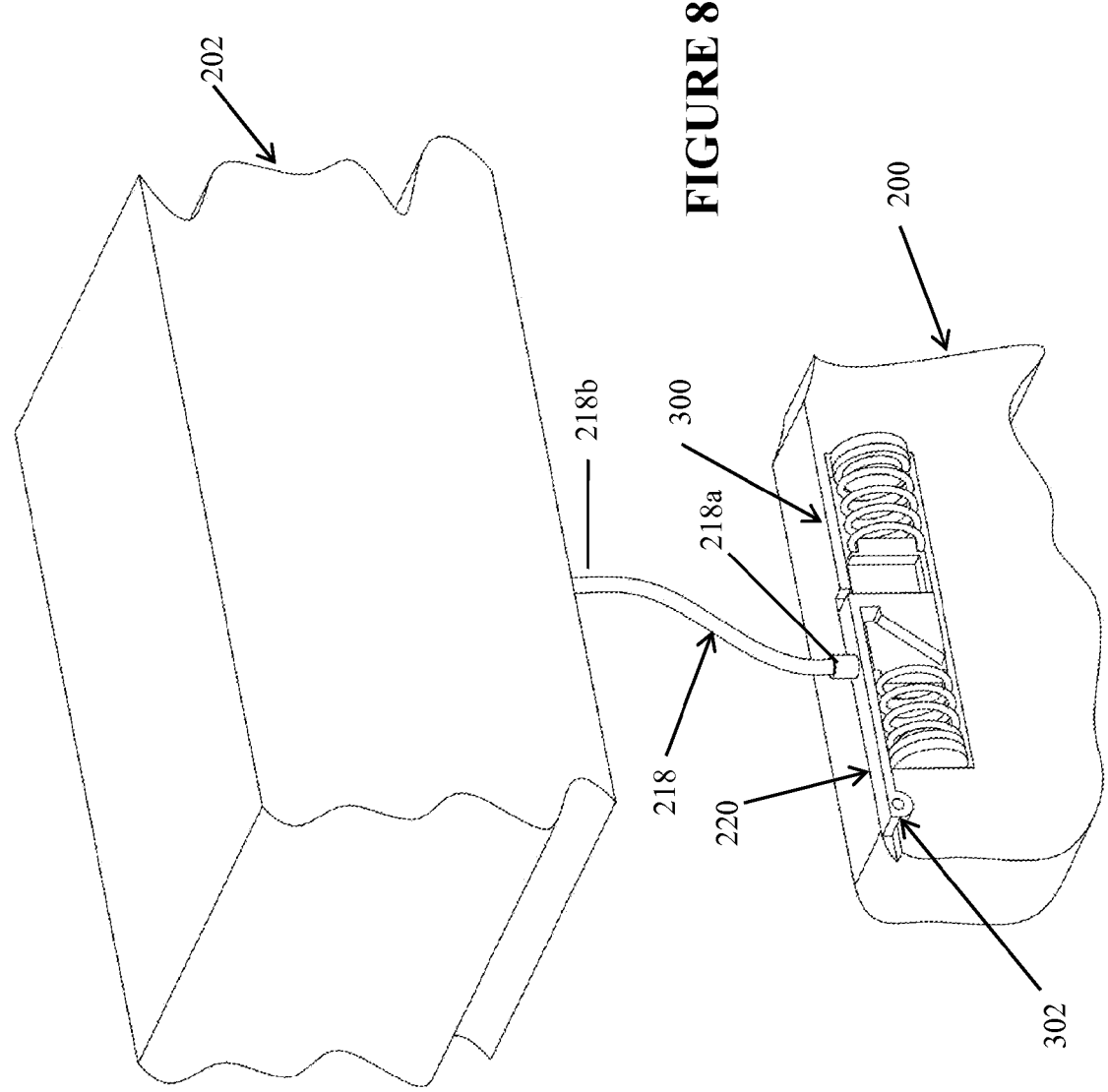
FIG. 8 illustrates the piezoelectric-based event detection and electrical power generator unit with the weapon mounted onto the weapon rack.
Figure 9:
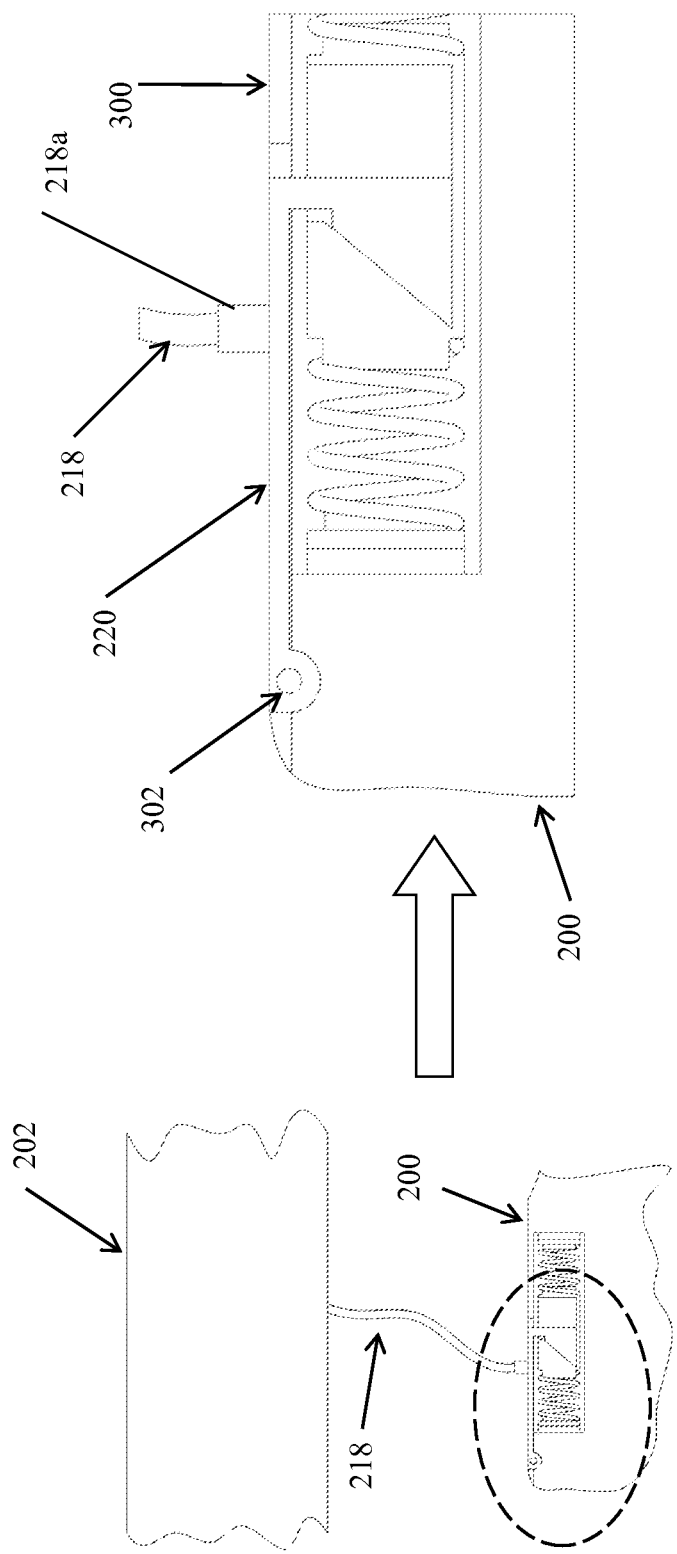
FIG. 9 illustrates a side-view close-up of the piezoelectric-based event detection and electrical power generator unit.

A variation of the embodiment illustrated with regard to FIGS. 2-7 is described with regard to FIGS. 8-11. FIG. 8 illustrates the weapon 200 mounted onto the release rack 202 (although the points of attachment between the weapon and release rack are not shown in FIG. 8, the rack and weapon are assumed to be releasably attached by any means, such as in a manner well known in the art). A close-up of the piezoelectric-based event detection and power generator 300 is shown in FIG. 9. The piezoelectric-based event detection and electrical energy power generator 300 is very similar to the generator 204 shown in FIGS. 2-7, except that the preloading wedge link 220 is attached by a fixed hinge 302 to the weapon shell 212 as shown in FIG. 9.

Figure 10A:
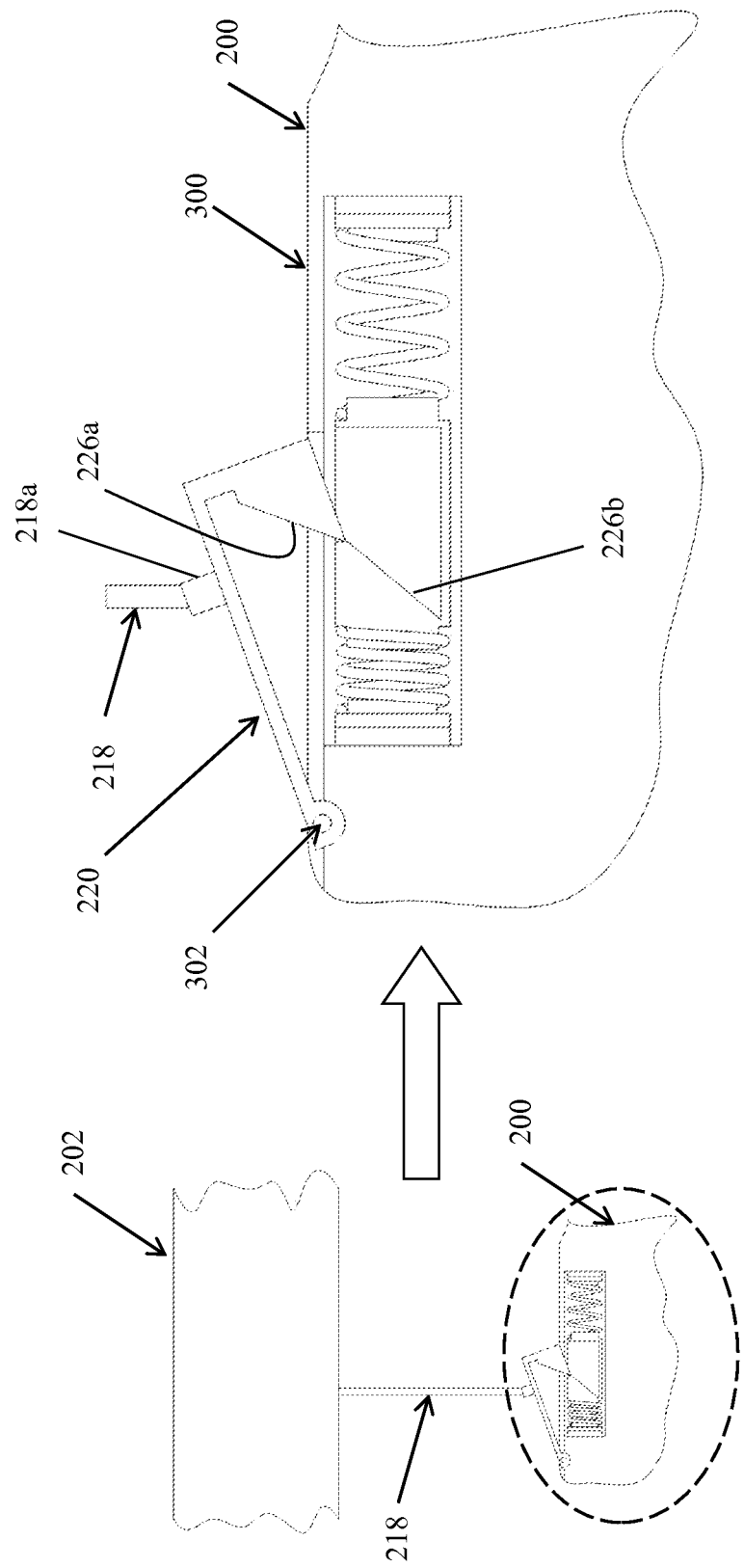
FIGS. 10a and 10b illustrate as the weapon is released, the lanyard pulls on the spring preloading wedge link, causing it to rotate counterclockwise and preload the device springs, and the released mass-spring unit begins to vibrate as the weapon is released.
Figure 10B:
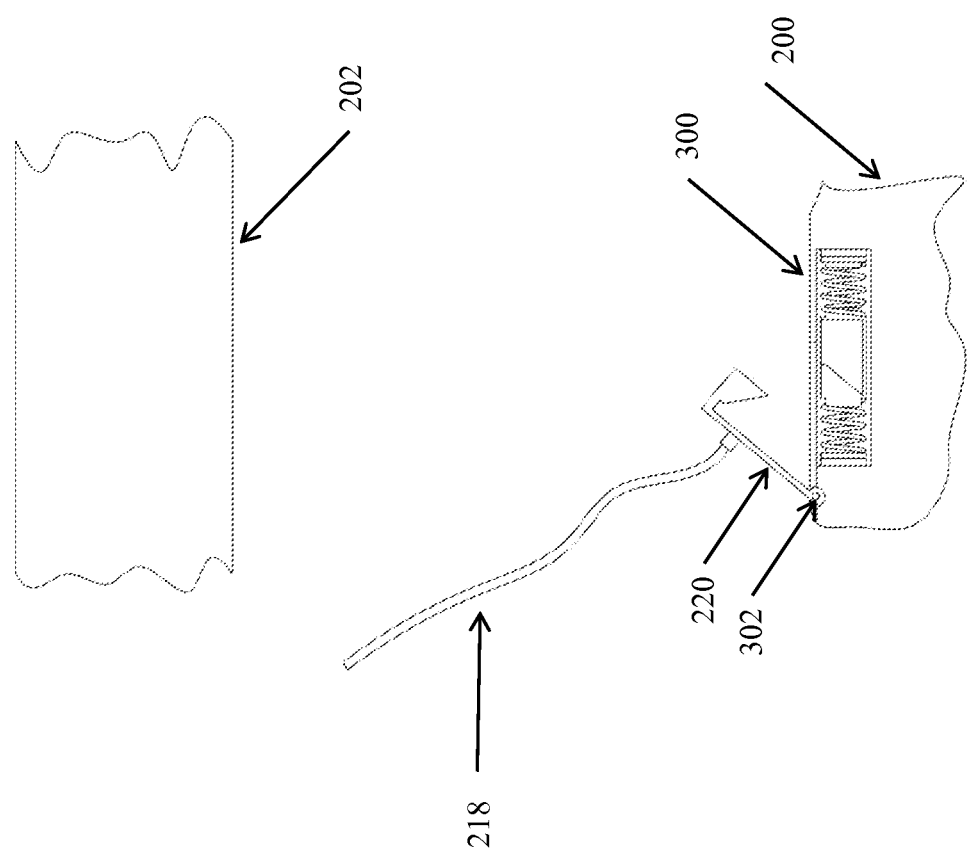

Since the preloading wedge mechanism link 220 is hinged to the weapon shell 212, when the weapon 200 is released from the rack 202, the lanyard 218 would similarly rotate the preloading wedge mechanism link 220 counterclockwise, thereby first preloading the device springs 216 and then releasing the mass unit 226 as shown in FIG. 10a. The mass-spring unit 206 of the generator 206 will then begin to vibrate and generate electrical energy as previously described. However, unlike the concept of FIGS. 2-7, the preloading wedge mechanism link 220 stays attached (hinged) to the weapon shell 212 as shown in FIG. 10b. This variation may be more desirable in certain cases, particularly if the hinged link 220 is intended to serve another purpose such as creating vibration or be used to measure flow rate as discussed below.

c. Sliding Preloading Linkage Mechanism Design Concept

Figure 11:
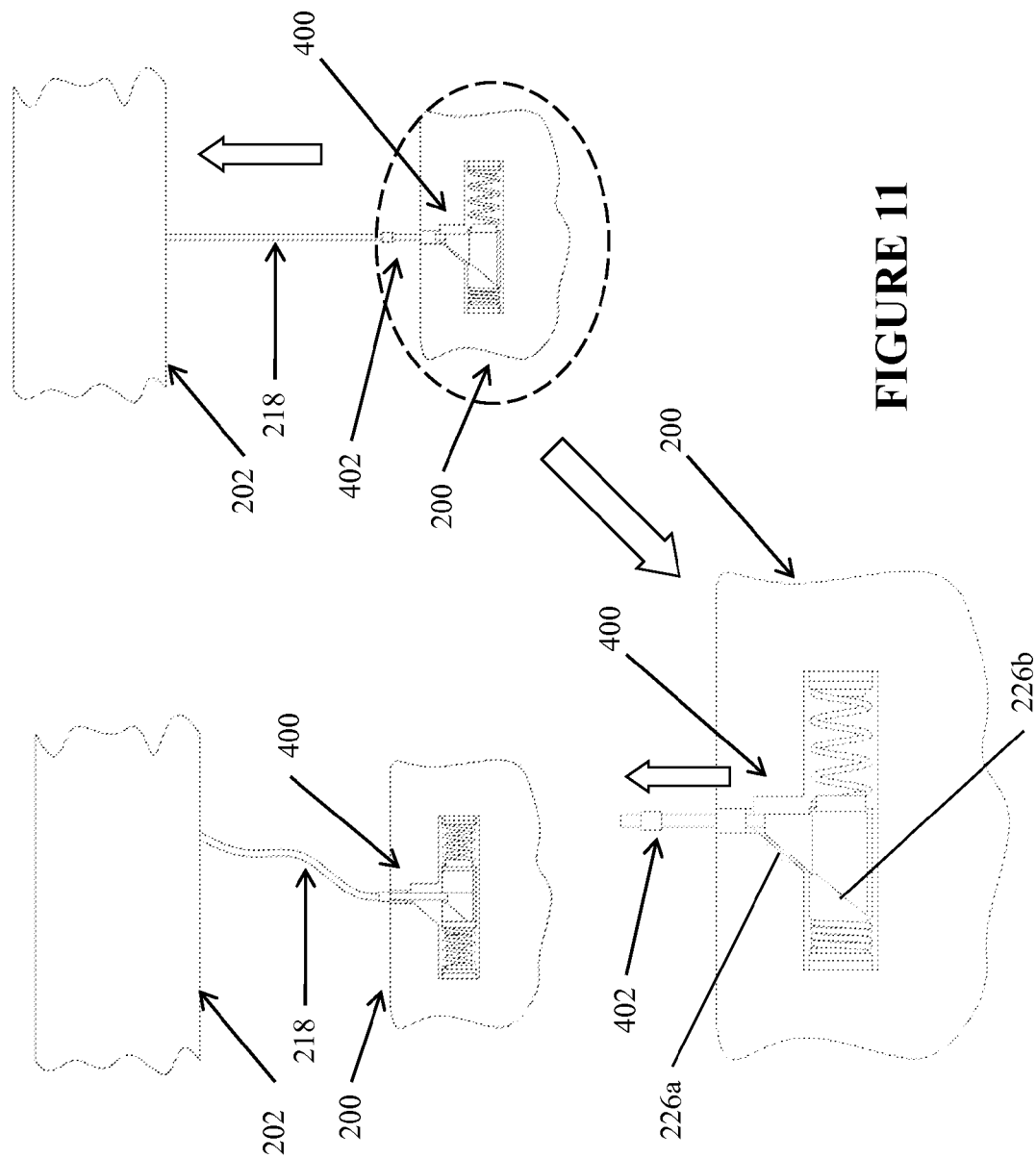
FIG. 11 illustrates the piezoelectric-based event detection and electrical power generator unit with the weapon mounted onto the weapon rack (up left) and as the spring preloading wedge is displaced by the pulling lanyard (up right—see also the blow-up view for more detail).

Another variation of that shown in FIGS. 8-10 is the replacement of the rotary joint of the spring preloading wedge mechanism by a sliding (prismatic) joint 400 as shown in FIGS. 11-12. The main difference is the motion (linear for this concept vs. rotary for the previous variation) of the spring preloading wedge mechanism link. A potential disadvantage of this variation is that sliding motions are more prone to sticking with the required pulling force being difficult to predict (unless low friction or ball bushings are used) and the fact that the device has to be embedded deeper inside the weapon to allow room for the sliding bearing. An advantage of this variation, however, is fewer parts and a simpler mechanism.

The weapon post release and total separation from the rack is shown in FIG. 12. As can be seen, the preloading wedge mechanism link stem 402 pulls the surface 226a from engagement with the surface 226b to release the mass element 226 and is sticking out of the weapon 200. The link stem 402 of the sliding joint 400 may be used for certain other functions, e.g., environmental sensing, such as flow velocity measurement, as discussed below.

The piezoelectric-based event detection and electrical energy generators have been actually reduced to practice and have been tested as having the following characteristics:

1. They start generating electrical energy and power device electronics and logics circuitry almost instantaneously (around 2-3 msec) upon the weapon release. As a result, they can be employed in gravity dropped weapons that are dropped from almost any altitude, including very low to very high altitudes.

2. They have zero stored mechanical and electrical energy prior to the weapon release for safety.

3. They are totally passive devices (no battery or charged electrical energy storage device), while allowing fuzing and other (low-medium power) electronics and logics circuitry to be powered almost instantaneously upon weapon release.

4. The angle of the spring preloading mechanism link wedge can be selected to achieve the desired spring preloading force/displacement to maximize the amount of stored mechanical energy in the device during the weapon release. The device can be readily scaled down (miniaturized) for future very small gravity dropped weapons or scaled up to generate a significant amount of electrical energy for most current gravity dropped weapons (electrical energy of several Joules can readily be generated with 4-5 inch long and 2 inch diameter devices).

5. By selecting proper mass to spring rate ratios for the mass-spring units of the device, natural frequencies in the range of 100-1000 (or more) Hz can be readily obtained. The higher the natural frequency corresponds to shorter time period needed for the power to become available to the fuzing electronics and logic circuitry. With currently available low voltage electronics, this means that the circuitry can become operational in 1-10 msec depending on the natural frequency of the device mass-spring unit. In general, a natural frequency in the range of 100-300 Hz have been found to be best from the energy harvesting efficiency point of view by limiting the amount of losses due to the internal damping of the spring elements and hysteresis of the piezoelectric elements.

6. They can be readily provided with safety pins that are pulled after the weapon has been loaded onto the aircraft weapon rack. The safety pin provides an added safety feature to the current design concepts, noting that all currently considered, including the above embodiments and those presented below can have built-in safety features that prevent them from generating any electrical energy without forceful pulling of the lanyard.

7. They may be used together with currently used wind turbine generators. Such "hybrid" power source systems will allow very low and very high altitude weapon drops, while allowing for the additional capabilities that wind turbine generators generally provide, including larger electrical energy generation for higher altitude drops, velocity measurement, etc.

8. They provide devices that have very long shelf life of well over 20 years.

9. Upon target impact by the weapon, the event is detected by the generated impulse force acting on the piezoelectric element of the device. They can also: (a) detect the direction of impact; (b) determine hard/soft target; (c) utilize impact to generate electrical energy to power fuzing electronics and logics to, e.g., provide for self-destruct and/or disarming functionalities to minimize the possibility of the weapon from becoming a UXO.

10. The spring preloading wedge mechanism links may be used for other purposes, some of which are described below, for example, for measuring aerodynamic flow (the approximate velocity of descent) or to provide additional input vibration generated by the fluttering in the airstream to the mass-spring unit of the device to generate additional electrical energy during the flight.

11. If the spring preloading wedge mechanism link is accidentally pulled, the link is prevented from being pushed back into the device by the crew and requires maintenance personnel to dismount the device and reassemble it. This feature is provided to ensure proper operation of the mounted weapon.

An embodiment of the mass-spring type piezoelectric-based energy harvesting generator 206 is shown in FIGS. 13a and 13b. The generator 206 consists of a single mass 226 (to which the surface 226b (not shown) is attached or integrally formed) and two springs 216, which are assembled in the housing 208, which can be cylindrical. Piezoelectric elements 214 are positioned between the ends of its housing and the two springs 216. Such configuration can avoid the use of helical springs that may be required for very high-G accelerations such as those encountered in gun-fired munitions and allows the piezoelectric elements to be used on each side of the generator while at the same time allowing the generator springs to be preloaded to increase the amount of mechanical energy stored in the springs for a given amount of mass element displacement (i.e., the displacement that a wedge element needs to provide by the pulling on the lanyard during weapon release). The preloading of the springs may be also used to ensure that the piezoelectric element is not subjected to tensile forces as the mass-spring unit vibrates post release. This may be necessary since piezoelectric materials are brittle and can withstand a limited amount of tensile stress.

In general, the amount of energy stored in the spring for a given amount of spring deflection is proportional to the spring rate and square of the spring deflection. The effect of spring preload is to increase the stored energy by increasing the average generated peak force. The spring preload is in general limited by the total length of the generator housing and the length occupied by the spring element and the maximum desired peak force generated by the spring at its maximum deflection position.

In addition, by increasing the size of the mass element for a given spring rate, the natural frequency of the vibrating mass-spring unit is reduced. It is noted that the main source of energy loss in such power generators is due to the natural damping of the spring element, which is directly related to the natural frequency of vibration of the spring-mass unit of the power source. For this reason, relatively low natural frequencies of vibration are generally desirable to increase the overall efficiency of the power source. The number of cycles that the mass-spring unit is to vibrate before the mechanical energy stored in the springs is extracted must be minimized since during each cycle of oscillation, certain amount of mechanical energy is lost due to the internal damping of the spring as well as the hysteresis of the piezoelectric elements. This requirement dictates that the piezoelectric elements need to have as high electrical energy charge generation capacity as possible. The rate of mechanical energy to electrical charge conversion of piezoelectric elements is increased by increasing their volume while decreasing their stiffness. This is generally best achieved by using piezoelectric elements that undergo flexural deformation (bending) under vibration induced forces.

It is noted that for a comprehensive optimization of a power source of the type presented in FIGS. 13a and 13b, all the above parameters and constraint relationships as well as the spring parameters (wire diameter and pitch) must be considered. In fact, the performance of the device may be significantly improved by using machined springs instead of helical (round) wire springs, which would also provide the opportunity to integrate the mass element and its provision for the preloading wedge component with the spring element itself.

In the generators, there are two main sources of energy loss (i.e., loss in the amount of available mechanical energy that could have been transformed into electrical energy). The first source is the internal damping of the spring element(s) and the second source the losses in the mechanical to electrical energy conversion system (i.e., the piezoelectric elements—due to hysteresis related losses—internal electrical leakage can be ignored since the charges generated by the piezoelectric element is intended to be rapidly harvested by the power source electronics).

As previously mentioned, to maximize the energy harvesting efficiency by minimizing losses from the aforementioned sources, the piezoelectric elements can generate as large a charge as possible in response to the forces applied by the spring element of the vibrating mass-spring unit. The piezoelectric elements can respond in such a manner to the applied forces in a "bending" mode (rather than in tension-compression, torsion or shear modes). For this reason, one of the best candidates for the present power source application is ring (washer shaped) type of bending piezoelectric elements, such as a CMB Ring type element manufactured by Noliac Corporation. These elements are designed to be held by their outer (inner) diameter while the inner (outer) diameter is displaced (forced) up and down. As a result, the disc is relatively flexible in flexural deflection ("bending") and can undergo relatively large deflections, thereby generating relatively large charges (per unit volume).

The maximum number of piezoelectric elements that may be used on each side of the present power source is determined by the peak force generated by the spring element and the blocking force for each of the piezoelectric element.

Dynamo-Type Generators Powered by the Lanyard

The embodiments described below can use a rip-cord mechanism 500 to drive a rotational dynamo electrical generator. The rip cords 502 are to be attached to the lanyard 218, which is then pulled during the weapon 200 release to power the generators 206. After actuation, the rip cord 502 travels with the weapon 200. FIG. 14a shows a design in which the rip cord is wound on a spool pulley 508 which is connected to a generator 504 and spins the generator 504 directly, with the possible inclusion of a flywheel 506 to store additional kinetic energy for increased power generation. In FIG. 14b, the rip cord 502 stores energy in a torsion spring 510 which will later drive the generator 504, possibly with input speed multiplication. Such a design is amicable to storing and generating a large amount of energy from a relatively low jettison velocity, since the energy stored in the torsion spring is independent of velocity. The embodiment of FIG. 14b is shown with a tapered progressive-torque spool pulley 512 which can be parameterized to tune the system for a constant input force, or any other desired torque profile. The rip cord can automatically detach from the spool pulley 508, 512 to allow for unencumbered operation of the generator 504.

Figure 15:
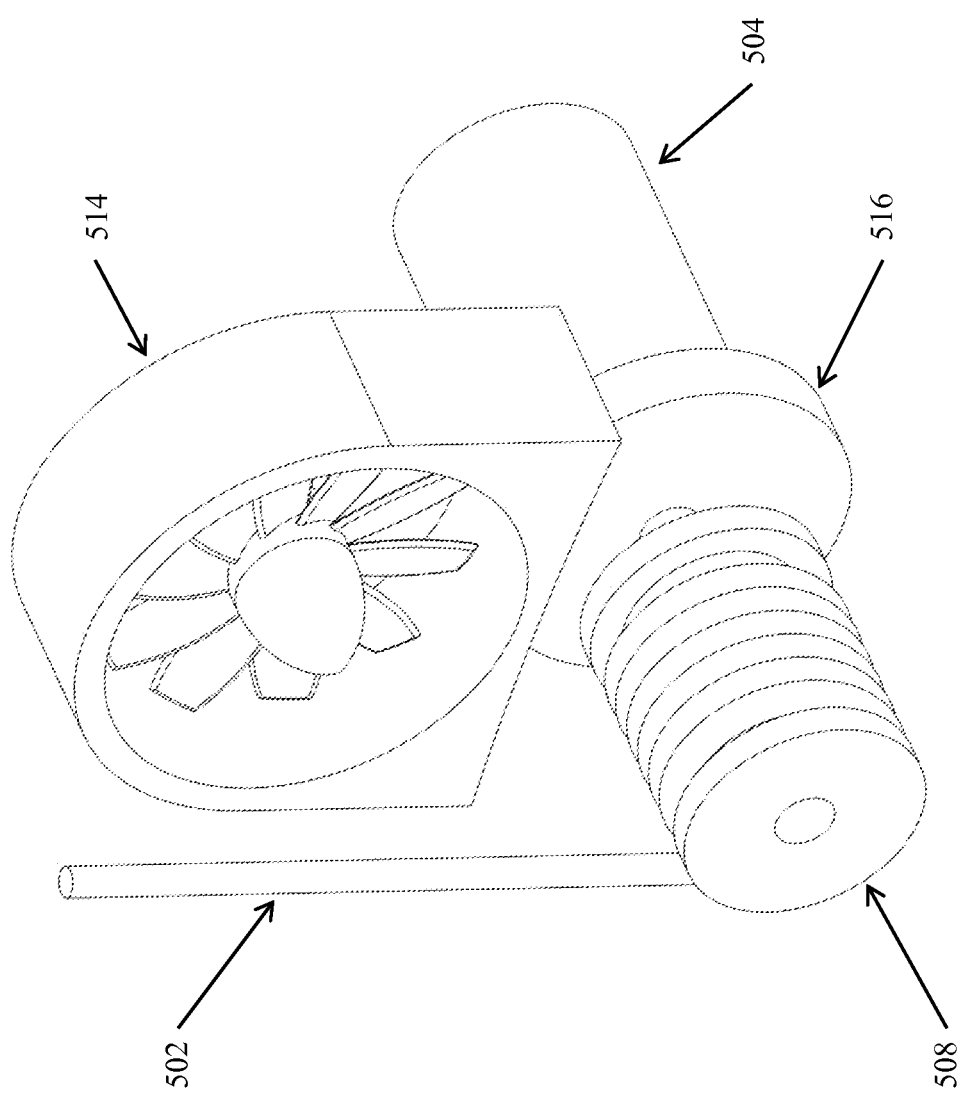
FIG. 15 illustrates a hybrid rip cord and turbine design.

FIG. 15 shows an embodiment which works in combination with a deployable turbine 514 to generate power over a longer period of time than might be practical using only a rip cord 502. Upon weapon 200 deployment, the rip cord 502 immediately provides an initial spin to the generator 504 before the turbine 514 is capable of appreciable output. The turbine 514 begins spinning at the same time when the initial impetus provided by the rip cord 502 is subsiding. The inclusion of a transmission/clutch 516 allows for the turbine 514 to power the generator 504 without the burden of continuing spinning the spool pulley 508 and vice-versa. A hybrid system such as this could be used to provide reliable electrical power to the weapon 200 throughout the duration of the weapon's flight with minimal change to an existing reliable and tested technology.

Other Environmental Sensing and Energy Harvesting Concepts Fluttering Element attached to Lanyard In this variation, an aerodynamically unstable "appendage" can be attached to the lanyard 218, which is deployed following the weapon release. This "appendage" can be the released spring preloading wedge mechanism link that "floats" following weapon release (see, for example FIG. 7). In such configuration, the lanyard can be attached to the mass-spring unit (such as via a second mass-spring unit) to pass the input vibration excitation to the main mass-spring unit to generate electrical energy.

It is also noted that the hinged spring preloading mechanism link (FIG. 9) may also be used as a fluttering element and its resulting vibratory motion used to transfer mechanical energy to the generator mass-spring unit to further generate electrical energy during the flight.

Flight Velocity Measurement

The aerodynamic flow over the deployed hinged wedge mechanism link (FIG. 9) or the sliding wedge mechanism link stem (FIG. 11) may be used to measure the flight velocity. This may be done, for example, by using the links to form a pitot-static (Prandtl) tube to measure the flight velocity. Other MEMS based devices may also be used for this purpose.

Commercial Applications

The "safe" and "arm" (S/A) devices discussed above can have a wide range of commercial uses, such as being used to initiate remote wireless sensors used for diagnostics, emergency detection and signal transmission, and for other similar purposes. Such devices can be adapted for environmental sensing as well as to trigger certain events or prevent certain events from being triggered which can have a wide range of commercial applications and benefits in industries such as automotive, aeronautical, emergency device, sporting, and the like. This is particularly the case with a "passive" means of electrically powering such sensors by harvesting energy from the environment to power electronics circuitry and logics without the need of batteries or wiring. In particular, wireless remote sensors can be used in which their operation is triggered by environmental events, such as fire or earthquake or flooding or the like, that could be positioned in remote locations for years and be activated upon being "armed" following such events to transmit emergency signals.

One interesting consequence of the mobile revolution is that more and more people are arming themselves with disposable cameras, portable CD players, cassette players, cell phones, palmtops, PDAs, and flashlights. Most manufacturers will consider using disposable batteries to power the disposable devices. This has forced battery manufacturers to improve their products' performance and to reduce the cost of the batteries for use in disposable devices.

The primary barriers to widespread development of disposable consumer electronic devices are associated with the disposable battery for such devices. Along with the current significant cost due to the battery itself as well as the additional components needed to incorporate and house the battery, disposable batteries must have a long shelf life and cannot pose significant environmental problems when disposed.

Incorporating the disclosed no-battery technologies in consumer electronic disposable devices in place of disposable batteries will reduce the cost of the devices as well as provide a very long shelf life for the devices while minimizing the negative environmental impact associated with disposing of the devices as compared to similar devices with disposable batteries.

Differentiating Accidental Weapon Release on Land from Actual Air Drop

Referring now to FIGS. 16-20*b*, methods and devices to differentiate air-drops from accidental ground-drops are provided. Turbine generators are known in the art to differentiate air-drops from accidental ground-drops since when air-dropped, the turbine begins to generate electrical energy. However, following an accidental ground dropping, the turbine generator is deployed but would not generate any electrical energy. The lanyard operated dynamo-type and piezoelectric-type event detection and power generation devices are, however, incapable of differentiating accidental weapon release on land from actual air drop.

Two potential methods and devices of measuring air speed that can be used in either dynamo-type or piezoelectric-type event detection and power generation devices are provided below. Such methods also have the advantage of potentially providing air speed information without being very sensitive to the direction of weapon descent.

Figure 16:
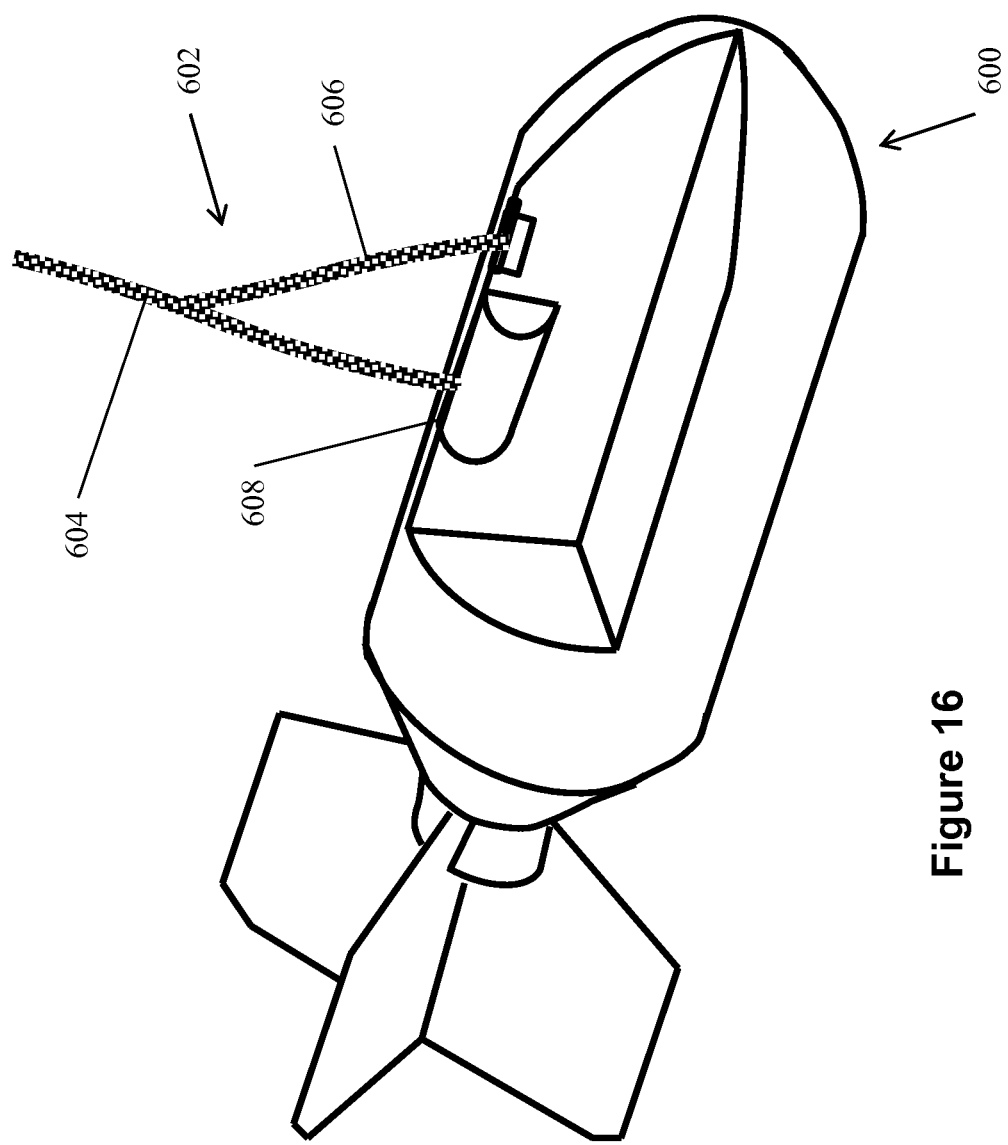
FIG. 16 illustrates a cut-away schematic of gravity dropped weapon having a first embodiment of a device to differentiate air-drops from accidental ground-drops prior to lanyard pull.
Figure 17:
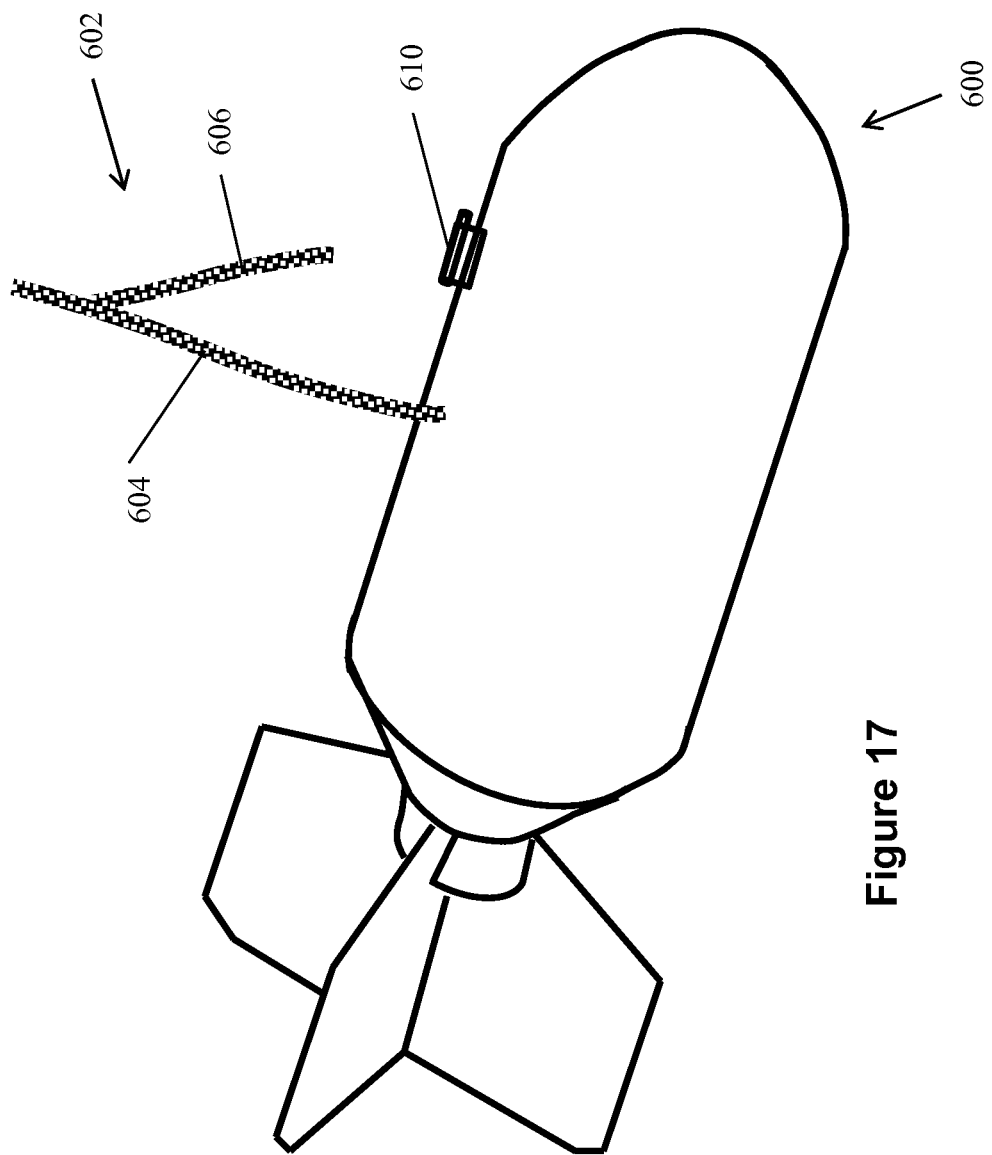
FIG. 17 illustrates the gravity dropped weapon of FIG. 16 (without the cut-away) after lanyard pull.

Referring now to FIG. 16, there is shown a cut-away schematic of gravity dropped weapon 600 having a first embodiment of a device 602 to differentiate air-drops from accidental ground-drops prior to lanyard pull is shown in FIG. 16. In the device 602, a lanyard 604 is provided connecting the weapon 600 to a platform (such as an airframe of an airplane) from which it is dropped. The lanyard 604 includes a connected portion, such as a short cable 606 attached to the lanyard 604 such that as the lanyard 604 is pulled (due to being dropped from the platform), it activates a power generation device, such as a dynamo-type or piezoelectric-type event detection and power generation device 608 (such as those described above). The pulling of the lanyard 604 also results in the pulling of the second short cable 606 out, thereby activating an air-velocity sensor. Although shown as a single lanyard having a short cable 606, two separate lanyards may also be provided (one to activate the power generation device and the other to activate the air velocity sensor).

In the first embodiment, the pulling of the second short cable 606 releases a relatively small Pitot-tube 610 (see FIG. 17) (or a cluster of two or more relatively short Pitot-tubes 610 that are oriented at different angles—e.g., at 120 degrees). The Pitot-tubes 610 are well known in the art for measuring air speed. Thus, the Pitot-tube 610 is operatively connected to output a signal representing one or both of an existence of an air-speed (indicating that the weapon has been air-dropped and is in free-fall rather than merely being accidentally dropped) to weapon safety circuitry (not shown). Thus, the activation of the Pitot-tube allows the weapon safety circuitry to differentiate air-drops from accidental drops on the ground. The weapon safety circuitry may alternatively determine an air drop based on both a power generation output from the power generation device and the detection of an air flow from the air velocity sensor.

The Pitot-tube(s) 610 can be relatively small (or externally mounted) since it is not used for very accurate air-flow measurement. When externally mounted, the short cable 606 can be used to remove a covering member or to deploy the Pitot-tube 610 from an internal position to an external position of the weapon 600. The deployed Pitot-tube 610 (such as a cluster) is shown schematically in FIG. 17. Components in the Figures are shown larger in scale relative to the weapon 600 for clarity. The smaller cable end 606 can be released such that it could not prevent full pulling of the dynamo-type or piezoelectric type generators 608. It is noted that the deployed Pitot-tube 610 may also be utilized as an auxiliary descent velocity measurement device.

Figure 18:
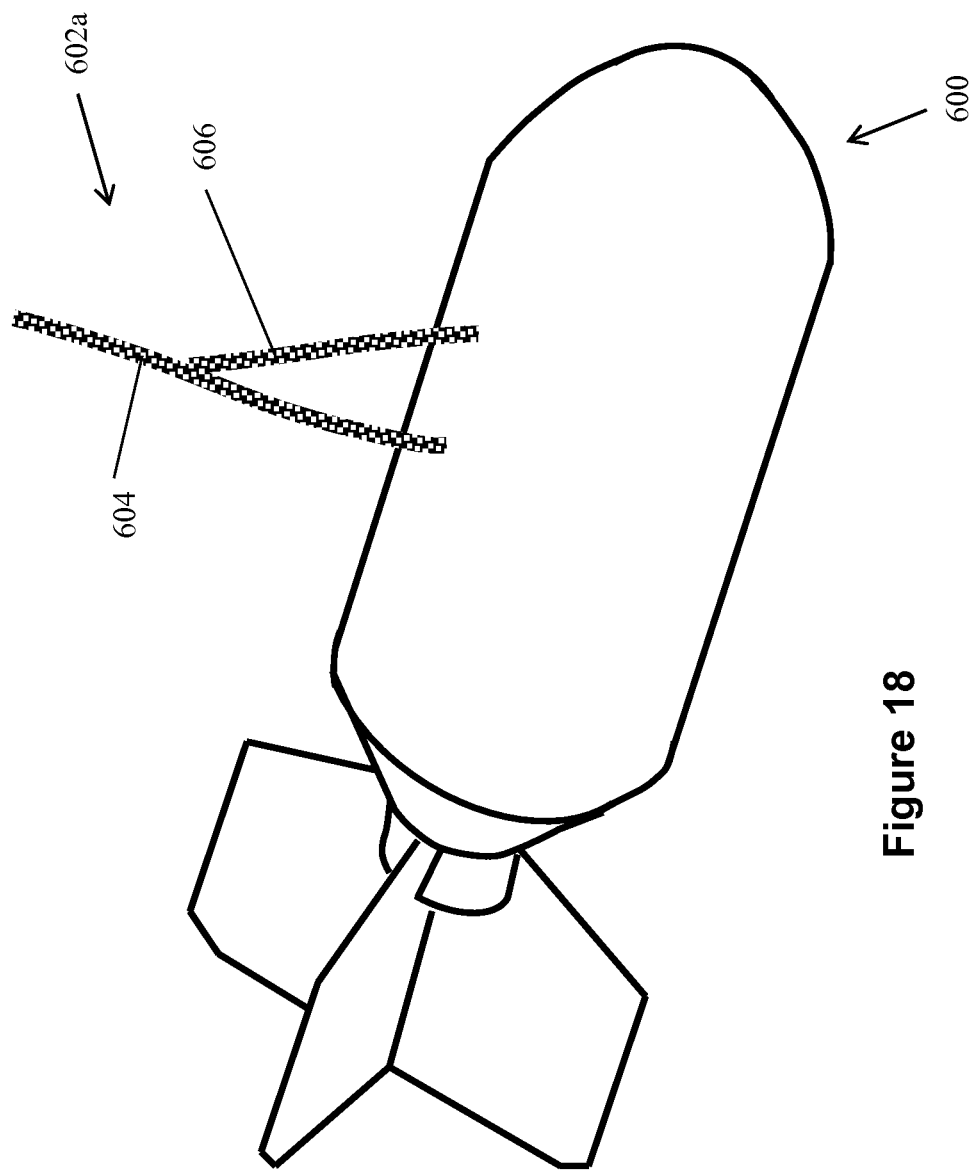
FIG. 18 illustrates a schematic of a gravity dropped weapon having a first variation of a second embodiment of a device to differentiate air-drops from accidental ground-drops prior to lanyard pull.

In a second embodiment, as shown in FIG. 18, the device 602*a* includes the short cable 606 is similarly attached to the lanyard 604 such that as it is pulled and activates the dynamo-type or piezoelectric-type event detection and power generation device 608 it would also pull the second short cable 606. As shown in FIGS. 19*a* and 19*b* (prior to lanyard pull), the split lanyard 604, 606 actuates the dynamo-type or piezoelectric-type generator and removes a small plug 612, exposing a port 614 which can use the Bernoulli Effect to sense velocity.

In an alternative version, the first and second embodiments are "combined" to provide an effectively "omni-directional" airstream velocity detector as shown in FIGS. 20*a* and 20*b*. In the alternative version, the device 602*b* includes an airstream detector 616, includes a sensor portion 618 fixed to the weapon 600 and a cover portion 620 releasably mounted to the sensor portion 618 and attached to an end of the short cable 606. The sensor portion 618 is covered by the cover portion 620 prior to release. The cover portion 620 is thereby removed by the short cable 606 upon weapon 600 release.

The "omni-directional" airstream velocity detector 616 has multi-sided inlets 622 that would allow it to operate in airstream with any flow direction. The detector 616 would in fact operate similar to a Pitot-tube (but may not be as accurate as a Pitot-tube with a long neck), but would differentiate air drops from accidental ground drops. The detector may also have a central through hole 624 to sense pressure drop due to Bernoulli effect.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device for differentiating an actual air drop of a gravity dropped weapon from an accidental drop of the weapon onto a surface, the device comprising:

a power generation device disposed on or in the gravity dropped weapon;

an air velocity sensor disposed on or in the gravity dropped weapon; and one or more lanyards having:

a first end connected to an airframe;

a second end releasably connected to the power generation device such that release of the second end with the power generation device initiates power generation by the power generation device; and a third end releasably connected to at least a portion of the air velocity sensor such that release of the third end one of activates or exposes the air velocity sensor to an air stream;

wherein differentiating the actual air drop from the accidental drop is at least based on a detection of an air velocity by the air velocity sensor.

2. The device of claim 1, wherein the power generation device includes an elastic element which is released by the second end.

3. The device of claim 2, wherein the power generation device further includes a piezoelectric member connected to one end of the elastic member for converting one or more of a stored and generated energy of the elastic member to an electrical energy.

4. The device of claim 1, wherein the one or more lanyards comprise a single lanyard having the first and second ends and the single lanyard further comprising a lanyard portion connected to the single lanyard, where the lanyard portion includes the third end.

5. The device of claim 1, wherein the air velocity sensor is one or more Pitot-tubes.

6. The device of claim 5, wherein the one or more Pitot-tubes and third end are configured such that the one or more Pitot-tubes are deployed by the release of the third end.

7. The device of claim 5, wherein the one or more Pitot-tubes and third end are configured such that the one or more Pitot-tubes are exposed by the release of the third end.

8. The device of claim 1, wherein the third end includes one of a plug or cover for exposing the air velocity sensor upon release of the third end.

9. The device of claim 1, wherein the air velocity sensor is one or more orifices configured as a Bernoulli effect sensor of air velocity.

10. The device of claim 9, wherein the one or more orifices and third end are configured such that the one or more orifices are exposed by the release of the third end.

11. The device of claim 10, wherein the one or more orifices comprise two or more orifices, each of which being configured to sense the air flow from a different direction.

12. The device of claim 1, wherein differentiating the actual air drop from the accidental drop is further based on a detection of power generated by the power generation device.

13. A method for differentiating an actual air drop of a gravity dropped weapon from an accidental drop of the weapon onto a surface, the method comprising:
   connecting a first end of at least one lanyard to an airframe;
   releasably connecting a second end of the at least one lanyard to a power generation device such that release of the second end with the power generation device initiates power generation by the power generation device;
   releasably connecting a third end of the at least one lanyard to at least a portion of an air velocity sensor such that release of the third end one of activates or exposes the air velocity sensor to an air stream; and
   differentiating the actual air drop from the accidental drop based at least on a detection of an air velocity by the air velocity sensor.

14. The method of claim 13, wherein release of the second end initiates the power generation in the power generation device by converting one or more of a stored and generated energy of an elastic member of the power generation device to an electrical energy.

15. The method of claim 13, wherein the release of the third end one or more deploys or exposes the air velocity sensor.

16. The method of claim 13, wherein the air velocity sensor is configured to detect the air velocity from more than one direction.

17. The method of claim 13, wherein the differentiating of the actual air drop from the accidental drop is further based on a detection of power generated by the power generation device.

* * * * *